July 29, 1952
G. E. REDFIELD
2,605,105
PHONOGRAPH RECORD CHANGER
Filed Dec. 2, 1946
9 Sheets-Sheet 1
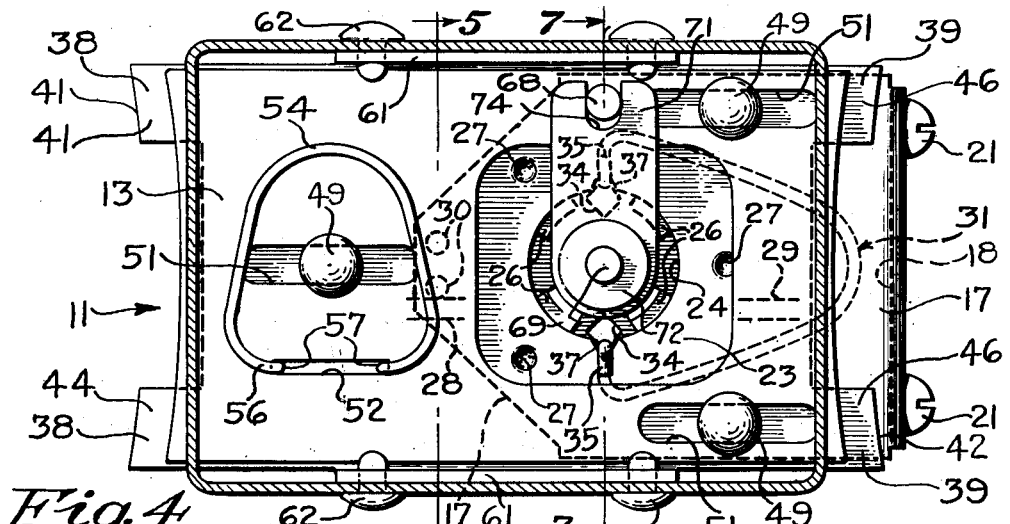
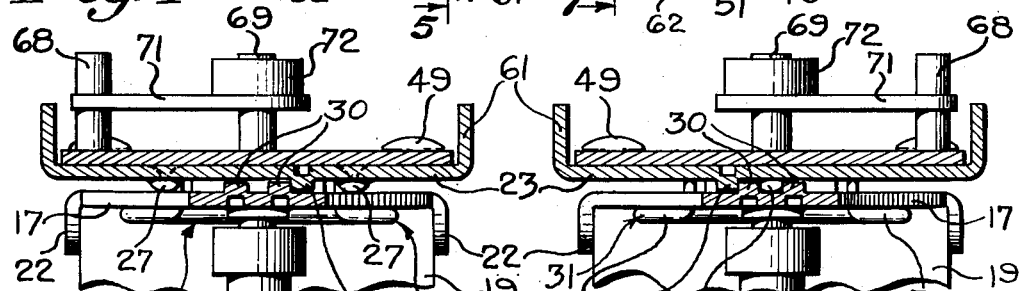
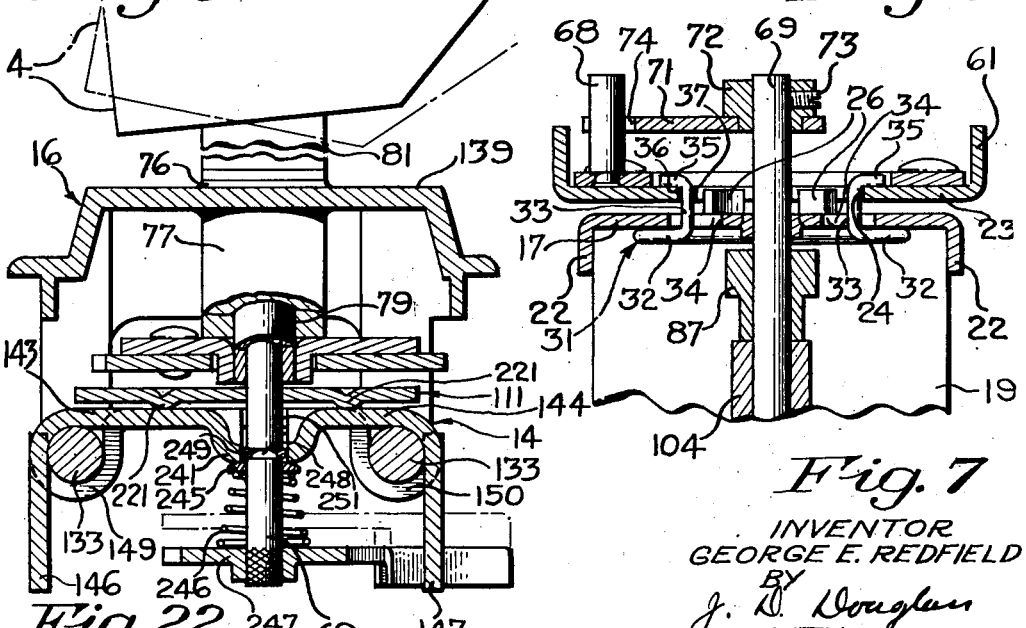
INVENTOR
GEORGE E. REDFIELD
BY
J. D. Douglas
ATTY.

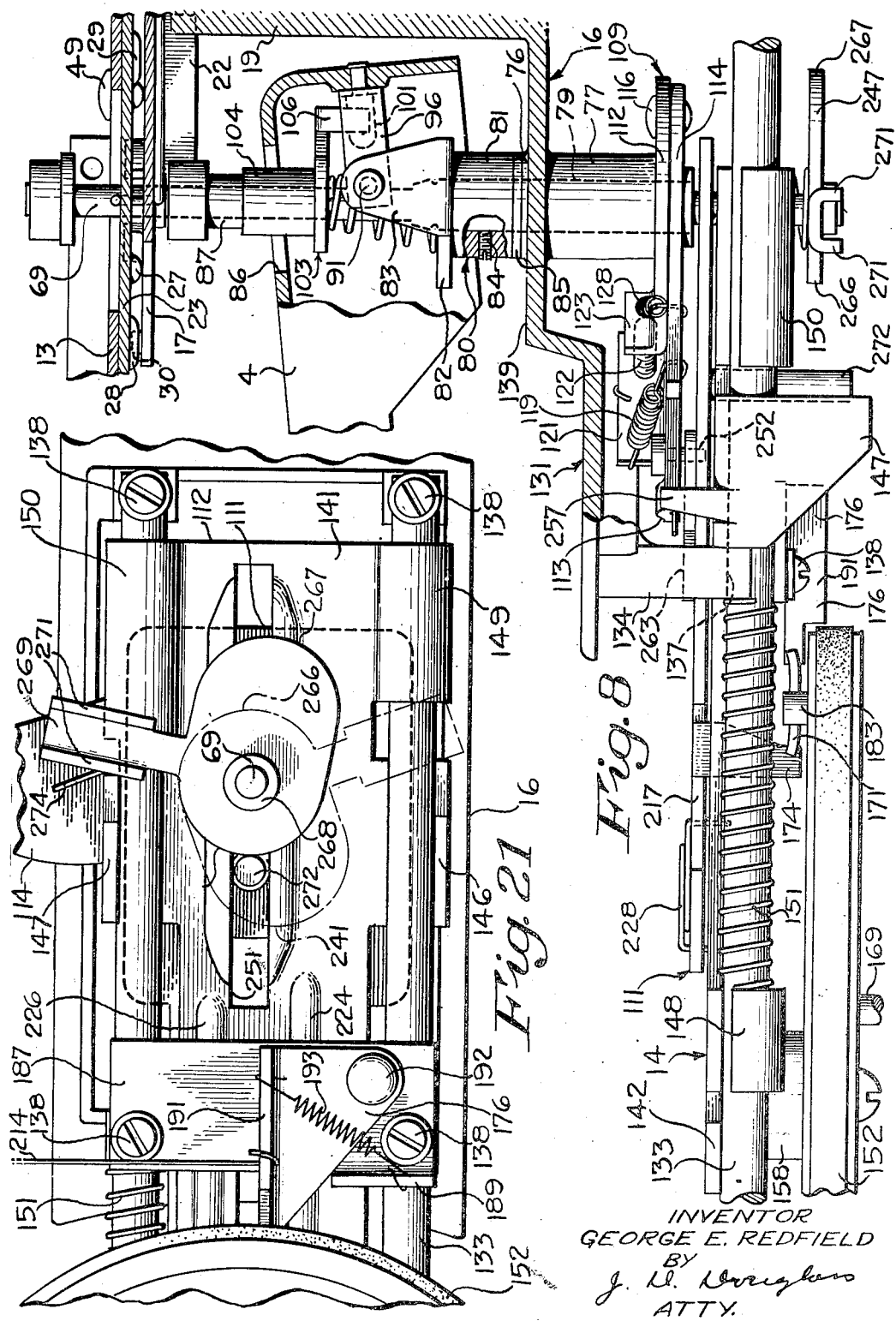

July 29, 1952
G. E. REDFIELD
2,605,105
PHONOGRAPH RECORD CHANGER
Filed Dec. 2, 1946
9 Sheets-Sheet 3
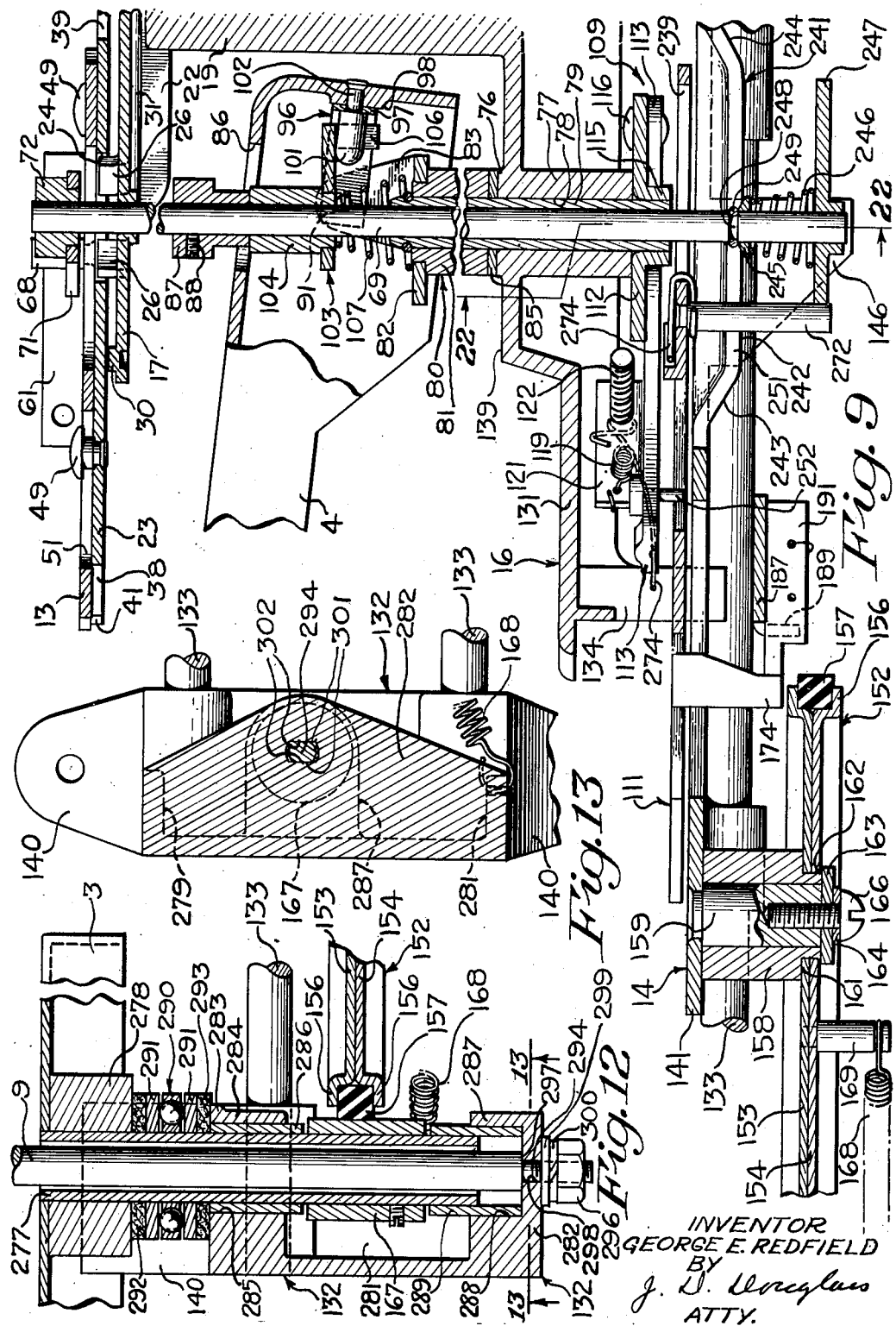
INVENTOR
GEORGE E. REDFIELD
BY
J. D. Douglas
ATTY.

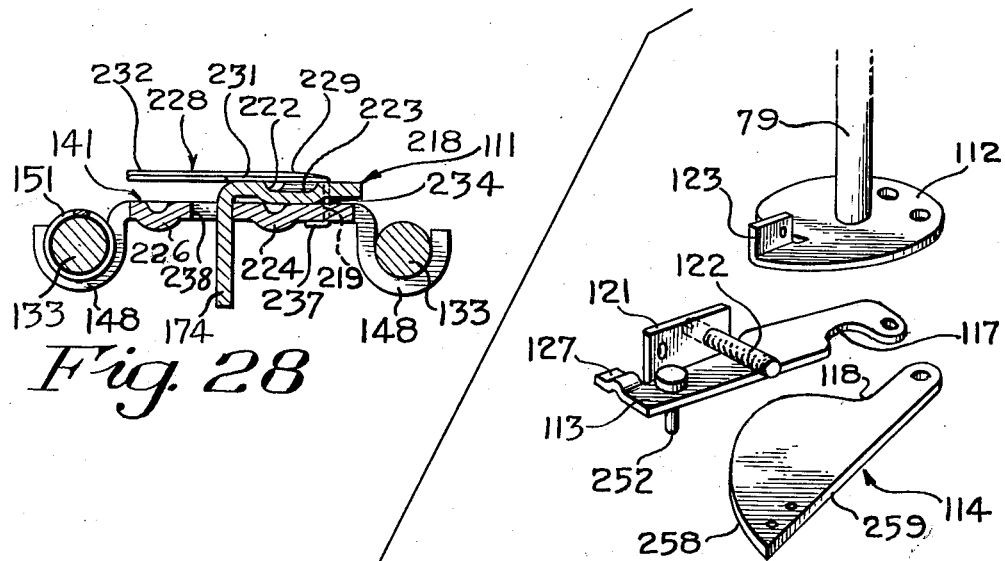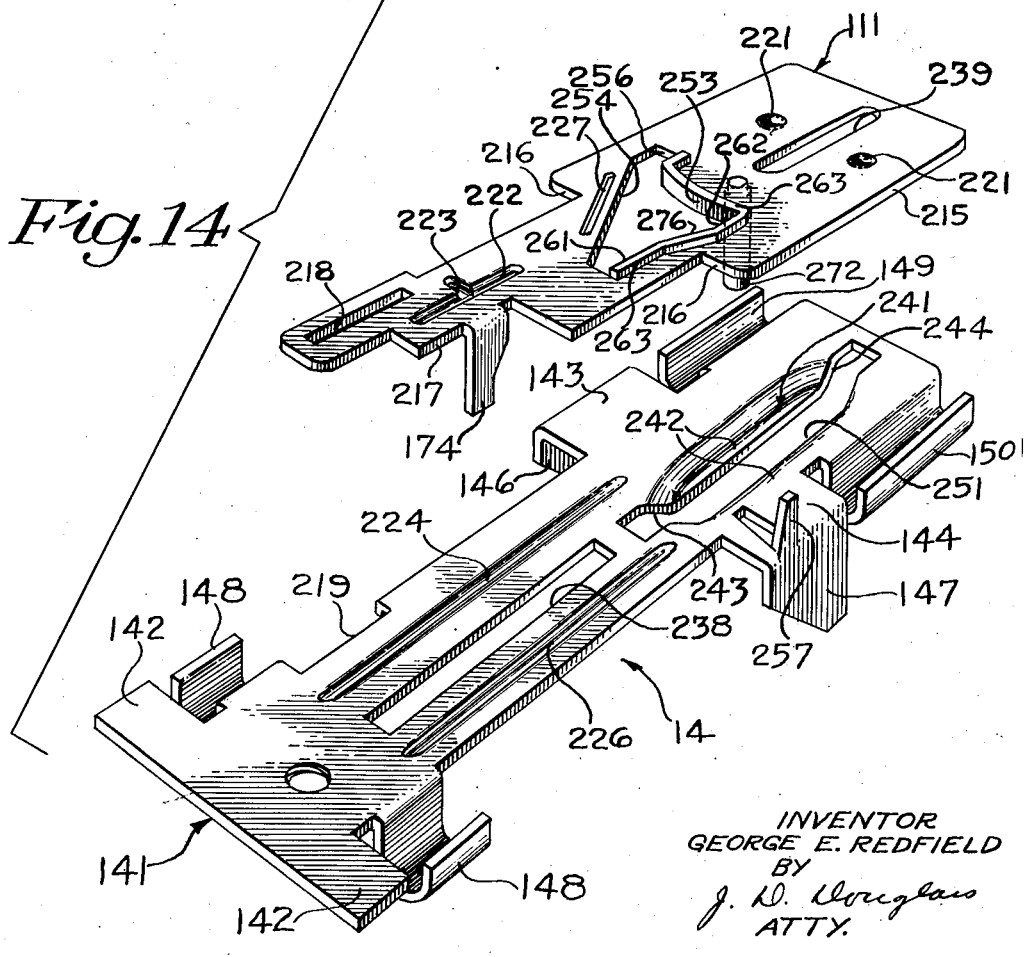

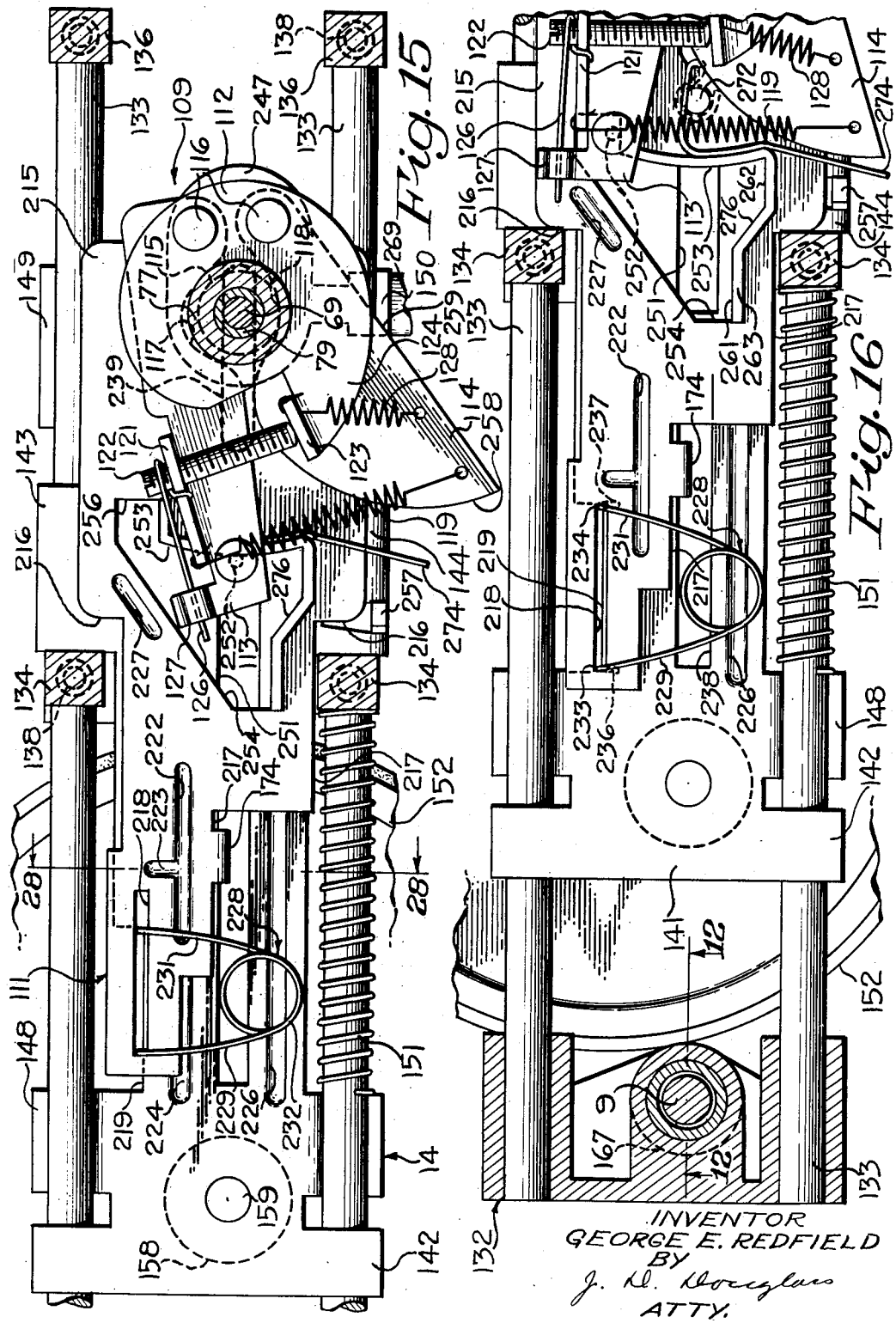

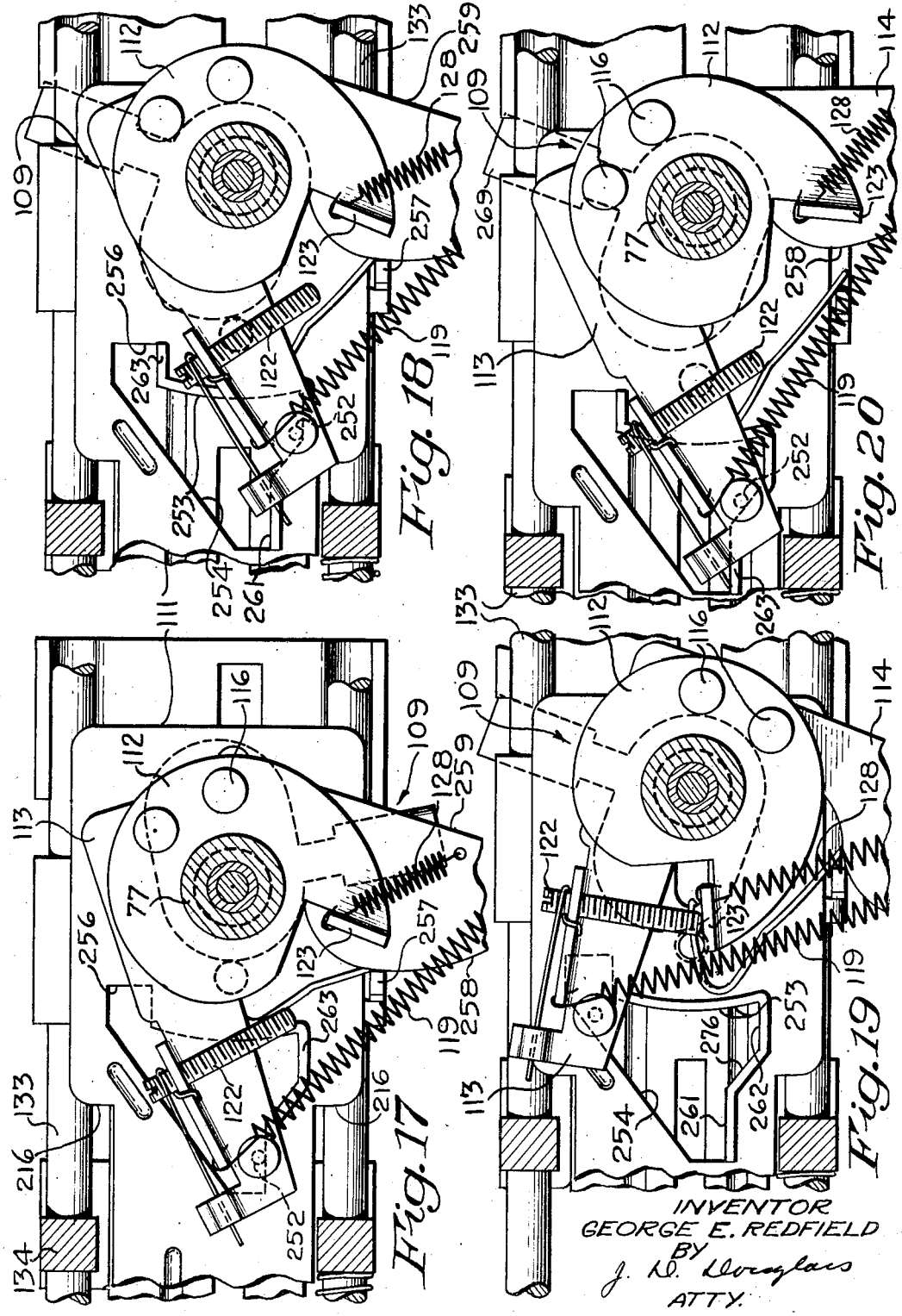

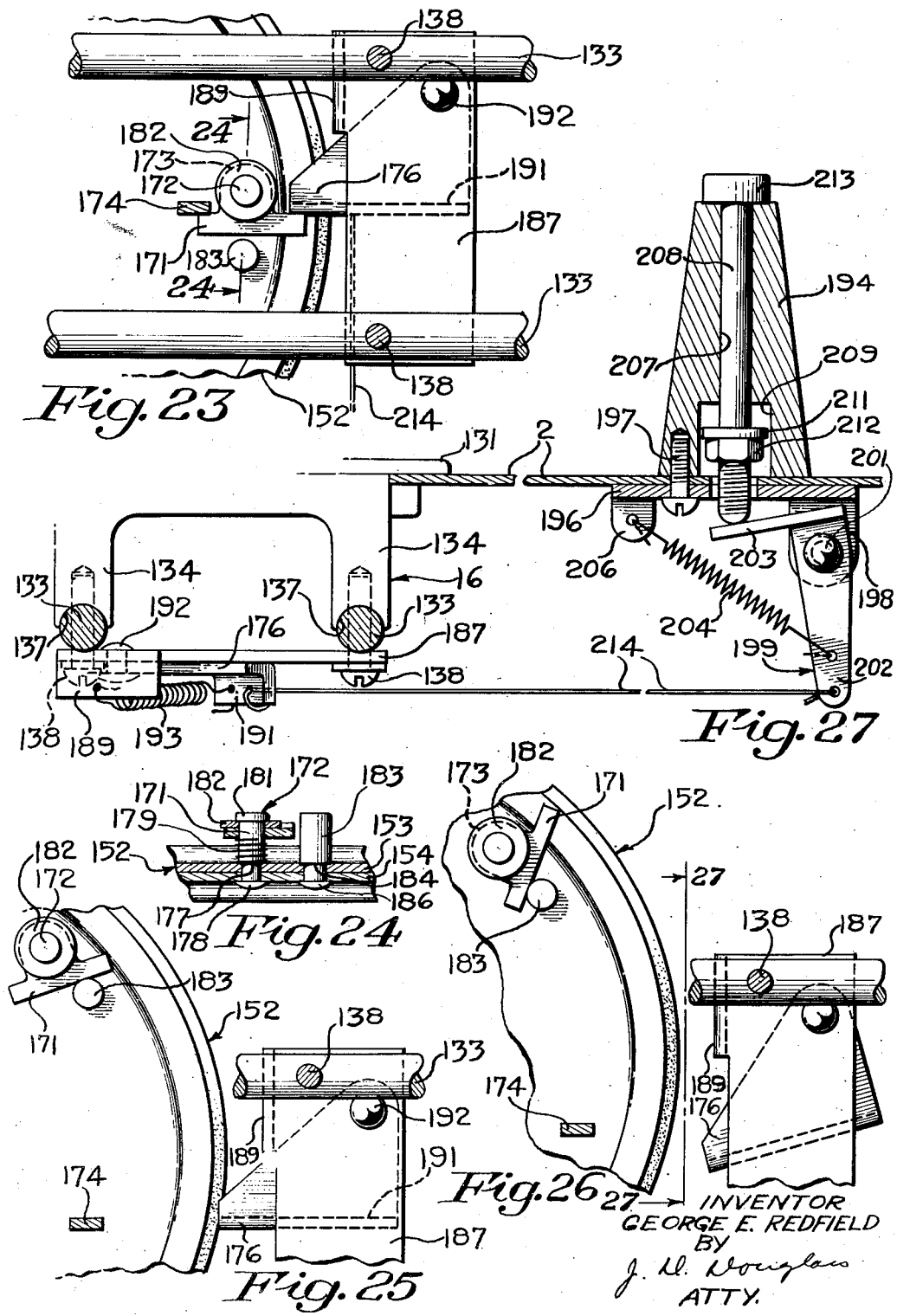

July 29, 1952 G. E. REDFIELD 2,605,105
PHONOGRAPH RECORD CHANGER
Filed Dec. 2, 1946 9 Sheets-Sheet 8
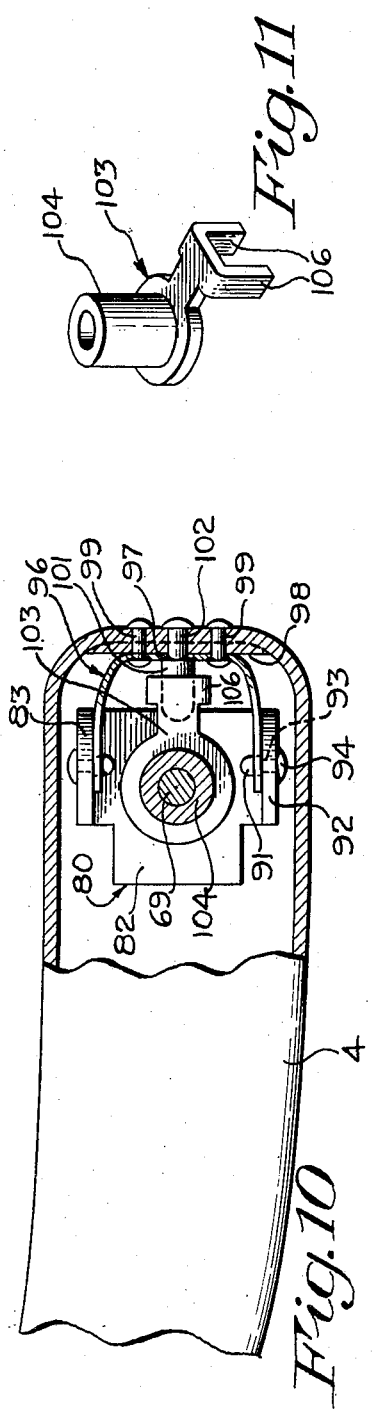
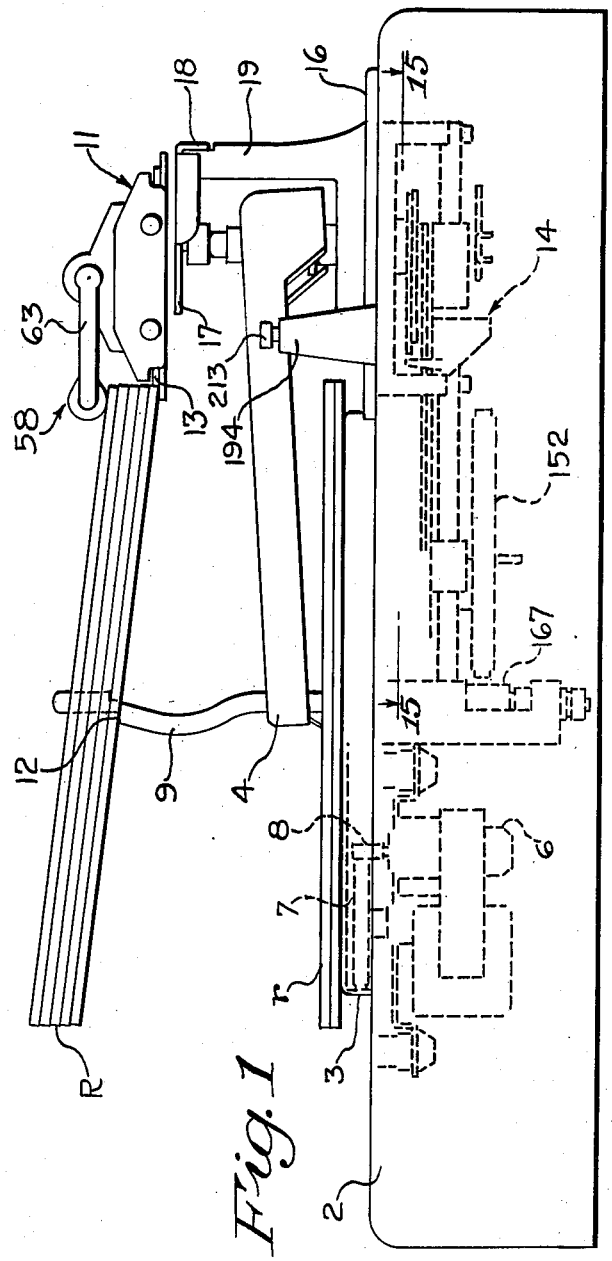
INVENTOR
GEORGE E. REDFIELD
BY
J. D. Douglas
ATTY.

July 29, 1952 G. E. REDFIELD 2,605,105
PHONOGRAPH RECORD CHANGER
Filed Dec. 2, 1946 9 Sheets-Sheet 9

INVENTOR
GEORGE E. REDFIELD
BY
J. D. Douglas
ATTY.

Patented July 29, 1952

2,605,105

UNITED STATES PATENT OFFICE 2,605,105

PHONOGRAPH RECORD CHANGER

George E. Redfield, Chicago, Ill., assignor to Admiral Corporation, Chicago, Ill., a corporation of Delaware Application December 2, 1946, Serial No. 713,525

14 Claims. (Cl. 274—10)

This invention relates to record players and more particularly to improvements in record changers of the so-called automatic type.

A limitation to record changers as commonly constructed is that they involve use of many parts, some of which are intricate of construction. Due, therefore, to the inherent nature of their structures, the cost of manufacture for such record changers is comparatively high, and in addition, they are comparatively subject to maladjustment and breakdown, especially when in the hands of inexperienced or careless persons; moreover, considerable skill on the part of a service man is required when a situation calls for repairs or adjustments to the record changers.

In a typical record player of prior construction a common disadvantage is the positive, or partially positive, control means which are employed to govern the position of the pickup arm from the point where a record is rejected to the point at which the pickup arm engages the succeeding record. The control means for manipulating the pickup arm, both laterally and vertically, being additionally of an intricate nature, one or more of its parts may be bent or fractured if the pickup arm is grasped and forced from its position when the arm is being automatically transferred from engagement with one record to engagement with the next record, thereby impairing or completely incapacitating the automatic mechanism for manipulating the pickup arm.

By my invention I have provided means which are yieldable yet effective for controlling the position of the pickup arm of my improved record changer. It is thereby possible at any time during operation of the record player to grasp the pickup arm and move it to various positions without injury to the mechanism which is adapted to manipulate the pickup arm. This is, in part, due to the manner in which I rigidly associate some of the links with others, while still other links of the mechanism are associated in slidable and/or pivoted relationship with spring means to provide yieldable relationship of the parts with each other.

Another advantage is to be found in the means employed for rejecting a record manually at any point after it is engaged by the pickup arm, the mechanism for performing this operation being considerably simplified.

Additionally, an advantage is to be found in an improved support for the pickup arm.

Still another advantage is apparent from the fewer number of adjustments on my novel record changer.

Additionally, it is noteworthy that I have incorporated the foregoing improvements in a record changer and, at the same time, employ materially fewer parts, with a consequent reduction in the cost of manufacture. Other advantages will be apparent from a consideration of the following description, taken with the accompanying drawings, in which:

In the drawings:

Fig. 1 is a view of a record player, in elevation, to illustrate a preferred embodiment of the present invention;

Fig. 4 is a plan view of the ejector head, on a reduced scale, the upper portion thereof being broken away to disclose the structure of parts within the head;

Fig. 5 is a vertical section taken on line 5—5 of Fig. 4;

Fig. 6 is a section corresponding to the section of Fig. 5, after the upper part of the ejector head has been rotated through a half turn in a position for dispensing 12-inch records;

Fig. 7 is a vertical section taken on line 7—7 of Fig. 4;

Fig. 8 is a fragmentary side elevation of mechanism for manipulating the pickup arm which is in the position it occupied while playing a record, parts being broken away to reveal the structure of other parts ordinarily hidden from view;

Fig. 9 is a vertical sectional view corresponding to Fig. 8 but depicting the mechanism during the changing of a record;

Fig. 10 is a fragmentary plan view of the pickup arm, a portion being broken away to reveal the means for supporting same, and the coil spring ordinarily with the arms having been removed;

Fig. 11 is a perspective view of the tilt arm for conveying rocking motion to the pickup arm from the ejector shaft;

Fig. 12 is a vertical section along the lines 12—12 of Fig. 16;

Fig. 13 is a vertical section on line 13—13 of Fig. 9;

Fig. 14 is an exploded view showing the carriage, the control member and the principal details of the yieldable torque mechanism;

Figs. 15 and 16 are sections taken substantially on line 15—15 of Fig. 1, Fig. 15 showing the positions that details of the mechanism occupy while playing a record, and Fig. 16 showing the temporary positions they occupy as the pickup arm trips the reject mechanism as said arm reaches the run-out groove;

Fig. 17 is a horizontal section taken on the plane of Fig. 15 and indicates the positions of elements of the yieldable torque mechanism when the pickup arm has been swung to an extreme position remote from the turntable, the record changer being adjusted for playing 10-inch records;

Fig. 18 is another section corresponding to the section of Fig. 17, the record changer having been regulated to play 12-inch records;

Fig. 19 is another section corresponding to Fig. 18 to show functions of the safety features incident to the construction of the yieldable torque coupling when the pickup arm is arbitrarily forced from the position it occupies in Fig. 18 to a position in which it abuts the spindle, the carriage and control member remaining in the positions they occupy in Fig. 18;

Fig. 20 is still another section corresponding to the Fig. 18 section and showing the function of the safety feature when the pickup arm is forcibly swung about its vertical axis until it strikes the column supporting the ejector head;

Fig. 21 is a fragmentary bottom plan view of the mechanism showing the stop cam;

Fig. 22 is a section taken on line 22—22 of Fig. 9;

Fig. 23 is a fragmentary plan view of the mechanism in the position it occupies while a record is being played;

Fig. 24 is a section taken on line 24—24 of Fig. 23;

Fig. 25 shows the parts indicated in Fig. 23, after the latch has been released automatically to provide for the record changing cycle;

Fig. 26 is another plan view corresponding to Fig. 25 to indicate the position taken by the parts when the latch is manually released to reject a record; and Fig. 27 is a vertical section taken on line 27—27 of Fig. 26, the manually operated trip mechanism being shown therewith; and Fig. 28 is a section on the line 28—28 of Fig. 15.

Figure 2:
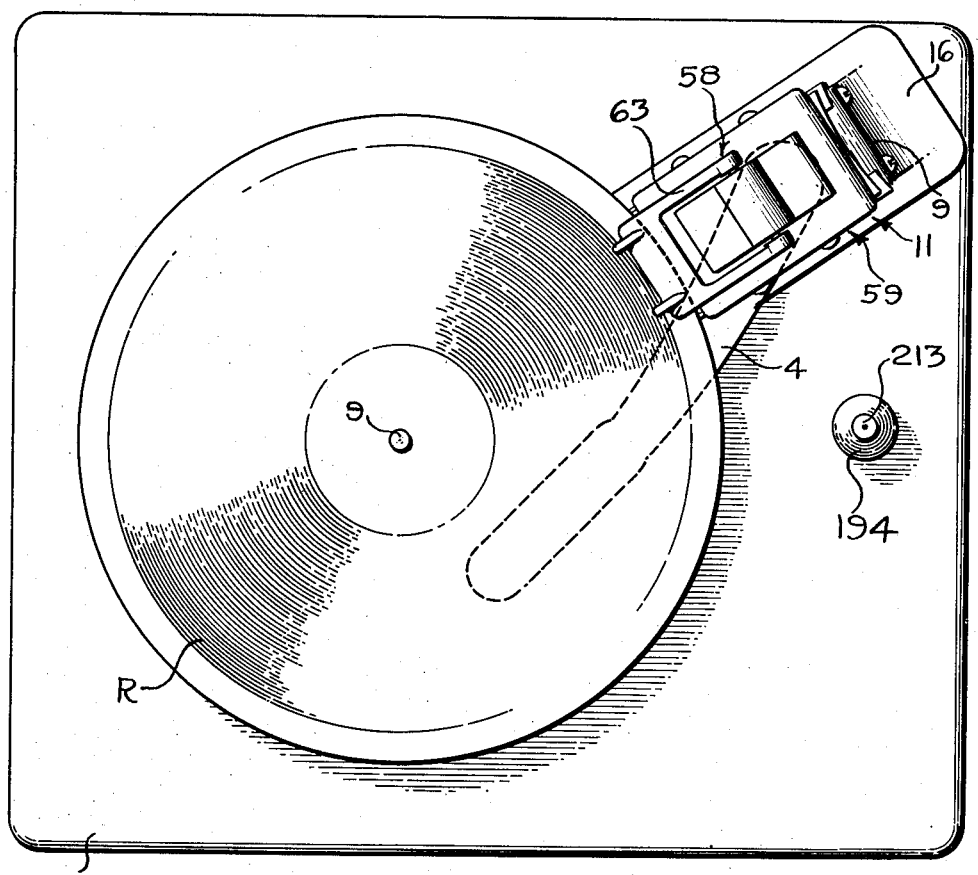
Fig. 2 is a plan view of the record player of Fig. 1.

In the drawing, wherein for the purpose of illustration, is shown one embodiment of the invention, the reference character 2 (Figs. 1 and 2) is used to denote a housing for the record changer while also included in the record changer is a turntable, 3, to support records so that they may be effectively engaged by a pickup arm 4. The turntable is driven constantly by a motor 6 through an idler pulley 7, pressed by resilient means, not shown, against the interior rim of the turntable by a pulley 8 on the motor 6.

Also included in the construction of the record changer are record dispensing means which comprise a spindle 9, centrally of the turntable, and an ejector head 11, supported substantially above the pickup arm to one side of the turntable. The spindle is adapted to extend through the center holes of a group of records R and to afford support for the group adjacent their center holes by a shoulder 12 on the spindle, the exact construction of the spindle being disclosed in the copending application of Willard J. Faulkner, Serial No. 493,242, now Patent No. 2,498,333. The ejector head engages records of the stack R, at their peripheries, by providing support thereat and clamp means, later to be described, to press the records against the support. From the support of the head 11 and shoulder 12 the records are dislodged one-at-a-time by a push plate or ejector plate 13 (Figs. 3 and 4) which is adapted to be oscillated indirectly from the motor 6 by means which include a carriage or movable frame 14 (Fig. 1) in slidable association with a stationary frame 16, both of which will be described hereinafter. After the records are released from the shoulder, they are guided by the spindle downwardly to the turntable where they accumulate, and from whence they must be manually removed and again placed on the spindle, in inverted position, before the remaining side of each record may be played.

The ejector head 11 provides support for both 10-inch and 12-inch records, since it is mounted eccentrically of its vertical axis. In order that the ejector head may possess this capacity, I provide a bracket plate or supported plate 17, Fig. 3, preferably struck from sheet metal. The plate 17 is provided at one end thereof with a downwardly extending flange 18 which is attached to a vertical column 19 by screws 21, the column being an extension of the frame 16. Laterally thereof the plate 17 has downwardly extending flanges 22, to add rigidity to the plate in its function as bracket and bearing. Pivoted on the plate 17 is a rotatable plate 23 which is preferably of sheet metal having an aperture 24 therethrough (Figs. 4, 7 and 9), the edge of which is of circular conformation to provide a bearing surface for a plurality of trunnion member 26, preferably struck from the plate 17 and adapted to extend therein. The plates 17 and 23 are spaced from each other by feet or projections 27 provided by deforming the plate 23.

It is imperative that the plates 13 and 23 be restrained from rotating through more than a half turn relative to the plate 17. Consequently, in changing from an adjustment in which the ejector head is in readiness for dispensing 10-inch records to an adjustment in which the head is adapted to operatively engage 12-inch records, the plates 13 and 23 are rotated counterclockwise from the position of Fig. 4. When changing from a 12-inch to a 10-inch adjustment, again the plates 13 and 23 are rotated clockwise. This is necessary owing to the structure and arrangement of other mechanism, to be described hereinafter. The stop means providing for this feature includes projections 28 and 29 on opposite sides of an arc about the rotary axis of plate 23. The projections 28 and 29 are struck from the plate 23 and extend downwardly so as to abut other projections 30, extending upwardly from one end of plate 17 from which they are also preferably struck. Although the projections 28, 29 and 30 are primarily for stop purposes and are spaced slightly from the adjacent plates toward which they extend, I also contemplate making them sufficiently long to add to the bearing surface between the plates.

Novel means are employed to clamp the rotatable plate 23 to the supported plate 17. It involves use of a spring 31, of arcuate structure, which is held in a state of deflection due to the manner in which its respective ends are anchored, within the limits of the aperture 24 (Figs. 4 and 7). The respective end portions of the spring are bent to provide shoulder portions 32, which extend toward each other. The shoulder portions are additionally bent to provide lateral portions 33, which extend upwardly through slots 34 in the plate 17 and aperture 24 in the rotatable plate 23. Nearer their extremities the end portions of the spring are again bent to provide hook portions 35, extending over the top of plate 23 and pointing away from each other. Inasmuch as the shoulder portions 32 are in abutment with the lower side of plate 17, and the hook portions 35 are in intimate association with the top of plate 23, said plates are thus clamped together in slightly spaced association with each other. Preferably, there may be a slight radius 36 on each of the end portions of the spring adjacent the hooked portions. The radii 36 then bearing against the upper edge of the aperture 24 provides cam action therewith to draw plates 17 and 23 together as the tendency of the spring to straighten exerts force against the wall of the aperture.

Provision is also made for resiliently locking the rotary plate in either of two positions. This is necessary to effectively support a stack of either 10-inch or 12-inch records. The expedient adopted involves use of diametrically opposite notches 37 in the walls of the aperture 24, into which the respective end portions 33 of the spring are adapted to simultaneously snap as plate 23 is rotated about the trunnion members 26. Preferably, the notches 37 are of V-shaped conformation so that as the plate 23 is so rotated, the edges of the notches pass only slightly beyond the spring portions 33, the outward force thereof, in cooperation with the slanting sides of the slots, effectively draw the plate 23 to one of the predetermined positions as the portions 33 quickly reach the bottoms of notches 37. It will also be apparent that since the inclined sides of the notches provide cam surface relationship to the portions 33 that forced rotation of plate 23 from the positions of Fig. 4 causes the spring portions 33 to be dislodged from the notches and to rest against the interior of aperture 24 between the notches in which plate 23 may be more readily rotated than from the Fig. 4 position. During these operations the spring portions 33 are adapted to move longitudinally of the slots 34, which slots also provide support for the spring.

It will now be apparent that the plates 17 and 23 may be operatively associated with each other by first inserting the trunnion members 26 into the apertures 24, then the ends of the spring having been pinched together sufficiently, are inserted through the slots 33 into the position they occupy in Fig. 4. It will also be apparent that corresponding ease of disassembly is provided since pinching the ends of the spring slightly permits the same to be withdrawn whereupon plates 23 may be readily removed from the trunnion members 26. Although assembly and disassembly is quickly and easily effected, the spring is effective at all times to hold the parts together without a tendency to accidental displacement.

The opposite ends of the plate 23 respectively provide support for 10-inch and 12-inch records. The plate 23 is of rectangular conformation and has, at one end thereof, a pair of fingers 38 (Fig. 4) while at its opposite end, the plate has a pair of fingers 39. The fingers preferably terminate in slanting extremities 41 and 42 substantially tangential to the respective peripheries of the sized records the fingers are adapted to support. As best observable in Fig. 4, the fingers 38 are adapted to afford support for 10-inch records since they are farther from the axis of the trunnion members 26, and consequently nearer to the spindle 9, than the fingers 39 which are adapted to support 12-inch records. Superimposed on the rotary plate 23 is the ejector plate 13, which is slidably anchored to the plate 23 and of thickness substantially less than the thickness of a record. The ejector plate is of generally rectangular conformation and substantially shorter than the rotatable plate 23. The plate 13 is normally held centrally of the rotatable plate by resilient means later to be described, thereby normally providing uncovered surfaces or record seats 44 on the fingers 38 and uncovered surfaces or seats 46 on the fingers 39. Both extremities of the plate 13 are arcuate in contour, the respective radii of their curved end surfaces being substantially equal to the radii of 10-inch and 12-inch records.

Figure 3:
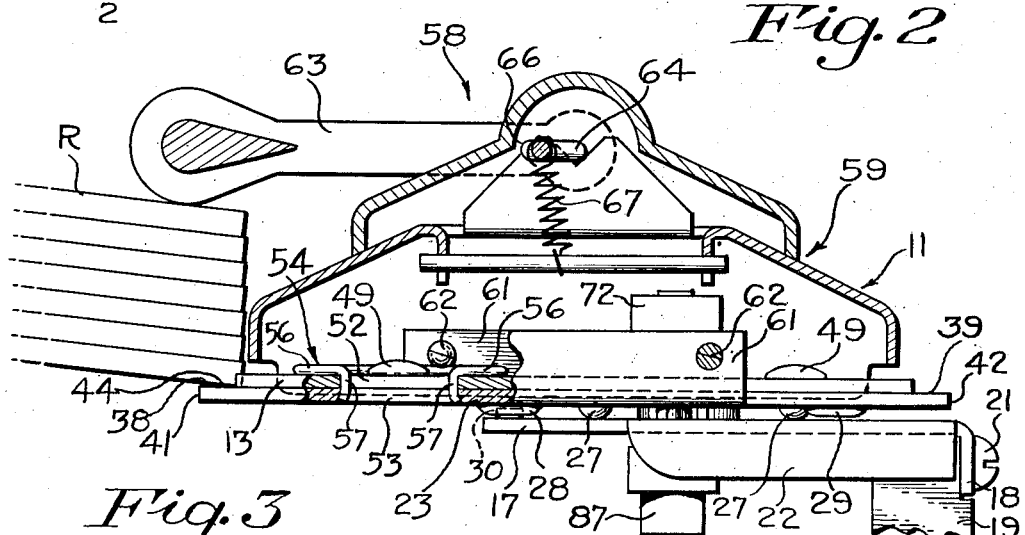
Fig. 3 is an enlarged view of the ejector head, in elevation, the upper portion thereof being broken away to disclose the structure of parts within the head.

Means to effectively anchor the ejector plate in a position centrally of the rotatable plate 23 includes headed studs 49. The studs are mounted on the rotary plate 23, and extend through guide slots 51 in the ejector plate 13. Additionally, the plate 13 is provided with a slot 52 which is similar to a slot 53 in the plate 23 (Figs. 3 and 4). In the position indicated, the slot 52 is in registration with the slot 53. This status is maintained by an arcuate spring 54 having arm portions 56 extending toward each other and in intimate association with the ejector plate 13. The arm portions are further bent so as to include anchor portions 57 extending through the slot 52 and into slot 53. If desired, the extremities of the anchor portions 57 may be bent away from each other slightly as shown (Fig. 3) so that slot 53 provides adequate retention for the spring to prevent displacement from said slot.

For maintaining engagement of the ejector head 11 with records of the stack R, the head includes a clamp 58. It comprises a composite cover 59, attached to upstanding flanges 61 on either side of the plate 23 by removable headed pins 62. Additionally, the clamp includes a yoke 63, rigidly mounted on a rock shaft 64 having a central crank section 66, to which biasing force of a tension spring 67 is applied urging the yoke to assume a position on either side of the shaft and, as in the Fig. 3 position, to press the stack of records against the seat 44. Since the bottommost record rests on the shoulder 12 and is adjacent one of the arcuate extremities of the plate 13, it will be apparent that as the ejector plate 13 is slid longitudinally of the rotary plate, so that one of the extremities of the plate 13 coincides with the extremities 41, the bottommost record is pushed from the support of the seats 44 and simultaneously from the shoulder 12 so that the record drops to the turntable 3. The ejector plate in this position is indicated in Fig. 9, together with crank means for moving the ejector plate against the resistance of spring 54.

In detail, the crank means includes a pin 68 rigidly mounted toward one side of the plate 13 and an axially movable rock or ejector shaft 69 journalled in the plate 17 concentrically of the trunnion members 26. In order that rocking motion of the shaft 69 may slide the push plate 13 longitudinally of the plate 23, an arm 71 is coupled to the shaft 69 by means of a hub 72. While the hub may be attached to the arm 71 in any convenient manner, it is preferably attached to shaft 69 by at least one set screw 73, to provide adjustment therewith. The free end of the arm 71 is provided with a slot 74 to accommodate the pin 68. It will thus be noted that, as the shaft 69 is rocked, this motion is communicated to the plate 13. Thus the push plate 13 is slid longitudinally thereof against the resistance of spring 54 from its normal position, indicated in Figs. 3 and 4, to its record ejection position indicated in Fig. 9.

Simple yet inexpensive means are employed to manipulate the pickup arm relative to a record on the turntable. It primarily includes a support about which the arm may rock vertically, in addition to means for swinging the arm about the ejector shaft 69 (Figs. 9 and 10). The frame 16 is therefore provided with a boss 76, directly below the trunnion members 26, while within the frame and below the boss 76 is a second boss 77. A bore 78 extends through the frame 16 from the boss 76 to the boss 77 to accommodate, in bearing relationship thereto, a sleeve 79 bearing a spider or pickup arm carrier 80 having a hub 81 on the base thereof. Upwardly thereof, the spider includes a section 82, preferably struck from sheet metal, and having ears 83 bent upwardly from either side of the section 82. The hub 81 and section 82, although rigidly coupled to each other in any convenient manner, are together rigidly but adjustably coupled to the sleeve 79 by a set-screw 84, a bearing washer 85 also being employed to space them from the boss 76.

The pickup arm 4, generally old in the phonograph art, is provided with an elongated aperture 86 in the top thereof, to freely accommodate members on the shaft 69 including a collar 87, clamped to said shaft preferably by a set-screw 88, so that the pickup arm may be rocked about pivots 91 on the ears 83. The pivots 91 may comprise studs having sections 93 (Fig. 10), of reduced diameter, extending through the ears 83 and having their outward extremities upset to provide rivet heads 94 for securing them in rigid relationship to the ears. Additionally, the ears embrace the ends of an arcuate resilient member 96, through which the studs extend. The arcuate member 96 has a central straight portion 97, adapted to be clamped in abutment with a pad 98, on the pickup arm, by rivets 99. It will, therefore, be apparent that while playing a record, one end of the pickup arm is supported by the record while the remainder of the pickup arm is supported by the pivots 91.

The arcuate member 96 partakes of the nature of a leaf spring since to dismount the pickup arm, the respective ends of the arcuate member are forced from close association with the ears 92 until the studs 91 no longer provide support for the arm 4. Since the member 96 is sufficiently resilient to enable the ends thereof to be deflected toward each other sufficiently to pass between the studs 91, the pickup arm may be thus readily assembled on its supports as the deflection forces are relieved.

When the pickup arm is disengaged from a record, novel support is additionally employed to sustain the arm. The support includes a stud 101 having a section 102 of reduced cross-section which extends through the portion 97 of the arcuate member and pad 98, a riveted end of the section 102 serving to clamp the stud to the pickup arm.

Means for rocking the pickup arm 4 includes a tilt arm 103 (Figs. 10 and 11), extending laterally of the shaft 69 and adapted to engage the stud 101. To provide for effective support thereof, the arm is coupled at one of its ends to the shaft 69 by a hub or hub portion 104 while laterally of the opposite end said arm has a pair of downwardly extending fingers 106, adapted to straddle the stud 101. The fingers are sufficiently long to provide for constant cooperative relationship between the arm 103 and the stud 101 regardless of the positions assumed by the pickup arm in the course of its operation. The hub 104 is slidable axially of and supported in rotatable relationship to the shaft 69 so that said hub portion is adapted to be resiliently pressed against the collar 87 by a spring 107, coiled about shaft 69 between hub 104 and the spider 80. While playing a record, the pickup arm is supported thereby and by studs 91, there being a space between the stud 101 and that part of the arm 103 directly above the stud 101 (Fig. 8). When, however, the shaft 69 is forced downwardly, by means to be described hereinafter, against the resistance of spring 107, arm 103 presses downwardly on stud 101 (Fig. 9) thereby rocking the pickup arm about its pivots 91, as a record is rejected.

To swing the pickup arm laterally about the shaft 69, I provide a yieldable torque coupling 109 as means for translating reciprocatory motion of the carriage 14 and a control member 111, both of which will be later described in detail, into rotary motion of the sleeve 79, on which the coupling 109 and pickup arm 4 are mounted. Elements of the yieldable torque coupling are best shown in Fig. 14. They include a support plate or support 112, rigidly mounted on the lower end of sleeve 79. The support plate is preferably formed from sheet metal, as are also a follower arm 113 and a cam arm 114. The arms 113 and 114 are pivotally connected to the support 112, at one side thereof by rivets 116, from which the arms extend to and substantially beyond the opposite side of the plate 112. Additionally, the arm 113 is notched at 117, and the arm 114 is notched at 118 to accommodate a hub 115 on the plate 112 and thereby permit the free ends of the arms to more closely approach each other. The arms 113 and 114 are urged toward each other by a tension spring 119 (Fig. 15) anchored to the end of the cam lever 114 and a lug 121, upwardly struck from the side of the arm 113. But the force of the spring 119 is resisted by a stop comprising a set screw 122, threaded in the lug 121, and abutting another lug or abutment 123, struck upwardly from an extension 124 of the plate 112. As a precaution against displacement from any position in which the set screw is set, a resilient wire 126 may be twisted around the screw 122 and one end of said wire hooked under an ear 127 while the remaining end of the wire is hooked over the top of the lug 121, Figs. 17-20. Additionally, a second tension spring 128 is anchored to the lug 123 and the free end of the cam arm 114. Preferably, the spring 128 may be shorter or substantially more resistant to elongation than the spring 119 so that the possibility of displacement of the cam arm 114 relative to the plate 112 is materially less than the possibility of the follower arm 113 being displaced relative to the plate 112. Although the stop 122 normally presses against the lug 123, the pickup arm is thus carried with the cam arm 124 except under circumstances which will be described hereinafter along with other functions of the yieldable torque coupling.

Since the arms 113 and 114 are indirectly manipulated by motion of the carriage 14, assisted by the control member 111, means for supporting the carriage 14 will now be described. It includes the frame 16 of composite structure. In detail the frame 16 comprises a sub-frame 131, coupled to a turntable frame 132 by a pair of rods 133, Figs. 9, 12 and 13. The sub frame, preferably of die cast metal, is of generally rectangular conformation, the edges of which extend over the top of the housing 2, to which the sub-frame may be conveniently attached. On its lower side are downwardly extending lugs 134 and 136 having grooves or stirrups 137 (Figs. 27) at the extremities thereof, adapted to have clamped thereagainst the rods 133 by screws 138 which extend upwardly through the rods and are threaded in the lugs 134 and 136. The lugs thus provide means for spacing the rods 133 and sustaining them in horizontal parallel relationship to each other. Upwardly thereof, the sub-frame includes a pad 139, which is surmounted by the column 19. The rods 133 extend through the turntable frame 132, to which they are rigidly pinned. The frame 132 may also be of die-cast metal and includes upwardly and outwardly extending arms 140 (Fig. 9), by which the frame 16 is adaptable of attachment to the housing 2, in any suitable manner. Other details of construction embodied in the turntable frame will be described hereinafter.

As previously indicated, the sub-frame 131, including the boss 77, provides support for the sleeve 79. Additionally, the frame 16 provides support for the turntable 3; while the movable frame or carriage 14 is adapted to slide along the rods 133 to which it is coupled.

In detail, the carriage 14 comprises a master plate 141 (Fig. 14), which may be preferably struck from sheet metal, and is of generally rectangular conformation. The plate 141 is supported in a horizontal plane by the rods 133 (Figs. 8 and 15). That this may be carried into effect, the plate includes, at the left hand end thereof, on either of its sides, a pair of ears 142 which are adapted to overlie the rods 133 and against which the ears are adapted to slide. The weight of the carriage and parts attached thereto is also supported by arms 143 and 144 which not only extend outwardly for slidable association with the upper sides of the rods 133 but terminate in downwardly extending lugs 146 and 147, in intimate association with the rods 133 (Fig. 22). To anchor the carriage against displacement upwardly from the rods 133 the plate 141 is provided with a pair of arms 148, adjacent the ears 142. From opposite sides of the plate 141 the arms 148 extend downwardly, thence outwardly and upwardly to embrace the lower and outward sides of the rods 133. The rods are similarly embraced by a pair of arms 149 and 150 (Fig. 22) laterally of the plate 141 at the right thereof.

It is desirable that resilient or cushioned means be employed for moving the carriage 14 along the rods 133. Therefore, a compression spring 151 is coiled about one of the rods 133 between arm 148 and the lug 134, to normally urge the carriage 14 to the position in which it is indicated in Fig. 15.

To move the carriage 14 from left to right a rubber-crowned, eccentrically-mounted pulley 152 is utilized. It comprises a pair of discs 153 and 154 (Figs. 9 and 12), struck from sheet metal, and rigidly attached to each other in any convenient manner. At their peripheries, the discs have spaced-apart flanges 156, to accommodate a rubber ring 157 therebetween. Eccentrically of the axis of the pulley is a hub 158, adapted to receive in bearing relationship therewithin a stud 159, extending downwardly from the plate 141. At the discs the hub 157 is of reduced cross-section, thereby providing a shoulder 161 against which the discs are clamped by an upset portion 162 of the hub. The pulley 152 is held on the stud by a washer 163, lockwasher 164 and a screw 166, said screw being threaded in the stud 159. It will therefore be apparent that the pulley 152 including its hub 158 are rotatable on the stud between the washer 163 and plate 141.

The rubber crowned pulley 152 is adapted to engage a knurled or friction pulley 167, driven with the turntable 3. The pulley 152 is urged to rotate, clockwise, from the dead center position of Fig. 15, by a tension spring 168, one end of which is anchored to the turntable frame while the remaining end is anchored to a pin 169, carried by the wheel 152. However, during playing of a record the wheel 152 must not be allowed to engage the pulley 167, since engagement of wheel 152 with the pulley 167 would cause the record to be immediately rejected. Therefore, obstruction means is provided to overcome the force of spring 168 to that the wheel 152 may be thereby held in spaced relationship to the pulley 167 until a desirable time has arrived for a record to be rejected.

The obstruction means, just referred to, involves use of a rock-bar or latch 171 (Figs. 23–26) pivoted on the wheel 152 by a pin 172. The pin passes through the wheel 152 and through an ear 173 laterally of the latch. The ends of the latch are preferably bent upwardly slightly (Fig. 8) to more effectively engage an abutment member 174, on the control member 111, and a manual movable abutment member 176, coupled to the frame 16 by means to be described hereinafter. At the discs 153 and 154 (Fig. 24) the pin 172 is of reduced diameter thereby providing a shoulder 177 against which the discs are clamped by an upset portion 178 of the pin. The latch 171 is held in spaced relationship to the wheel 152 by a compression spring 179, coiled about the pin 172 between the latch 171 and disc 153; while a head 181, on the pin, and washer 182, under the head, limit upward movement of the latch. Accordingly, the latch is adapted to be frictionally sustained in whatever positions it is moved to by either of the abutment members 174 or 176.

The abutment members 174 and 176 are adapted to move out of engagement with the latch 171 to permit the wheel 152 to be, first, initially rotated by spring 168 from the position indicated in Fig. 23, wherein a record is adapted to be played, to the second position of Fig. 25 or Fig. 26 in which initial engagement of wheel 152 and pulley 167 is established to reject a record and automatically put another record in readiness to be played.

A description of means involved for rejecting a record automatically will now be set forth, in brief. Such a mode of rejecting a record is carried out only when the pickup arm reaches the runout groove of a record. It will, therefore, be assumed that the wheel 152 is motionless due to the manner in which the abutment members 174 and 176 normally engage the latch 171 therebetween as indicated in Fig. 23. As the run-out groove swings the pickup arm to the predetermined limit of an arc that said arm is adapted to be carried through laterally the abutment member 174, which is carried by the control member 111 is moved to the left (Fig. 25), by mechanism to be described hereinafter, and out of engagement with the latch 171. Turning movement then being imparted to the wheel 152 by the spring 168, the latch turns on its pivot, as it moves past the abutment member 176. The friction between latch 171 and its supports is overcome as said latch is rotated clockwise slightly in being carried past the abutment member 176. Additionally, a stud 183 is carried by the wheel 152, adjacent the latch 171. The stud is of reduced diameter at the discs 153 and 154, a shoulder 184 being thus provided, against which the disc 153 is adapted to be clamped by an upset end portion 186 of the stud. To understand the purpose of the stud 183, it must be borne in mind that once one of the abutment members 174 or 176 is moved from its normal position (Fig. 23), when rejecting, that the abutment member is returned to its normal position before the latch 171 has had a chance to be carried through its entire orbit. It is also noteworthy that when in normal position there is sufficient space between the members 174 and 176 to afford passage for the latch therebetween, if the latch were turned through a quarter turn from its Fig. 23 position. Therefore, the stud 183 is employed to limit the rotation of the latch, and thereby provide for interception of both ends of the latch by the two abutment members.

Means for manually rejecting a record will now be described. By the means employed I am able to reject a record at any time after it has been engaged by the pickup arm. Mechanism to provide this feature includes a support plate 187 (Figs. 23-27), of rectangular formation, attached to the lower sides of the rods 133 by the screws 138. The plate 187 includes a downwardly flared lug 189, toward one end and on that side thereof which is adjacent the wheel 152. The abutment member 176 is of triangular conformation, being preferably struck from sheet metal and includes a downwardly extending flange 191. The member 176 is pivoted to the lower side of plate 187 by a rivet 192 passing through one corner of the member 176. Normally, the abutment member is maintained in the Fig. 23 and Fig. 25 position, in which it abuts the lug 189, by a tension spring 193, anchored between the lug 189 and flange 191. It will, therefore, be apparent that when the member 176 is rotated, counter-clockwise, from the position it occupies in Fig. 23 to the position it occupies in Fig. 26, against the force of spring 193, that the latch 171 is carried past the abutment member 174, which the latch passes by swinging counter-clockwise about the pin 172 as it has in Fig. 26.

But the force necessary to rock the abutment member 176 about its pivot 192 is conveyed from a trip mechanism above the housing 2. This mechanism, best shown in Fig. 27, provides versatile means for rocking the member 176 since the trip mechanism may be mounted in a variety of positions on the housing. This is due to its inherent construction and the novel manner by which it is coupled to the member 176. In detail, the trip mechanism comprises a pedestal 194, above, and a bracket 196, below, the horizontal wall of the housing 2, to which the pedestal and bracket are clamped by screws 197, but one of which is shown. Laterally of the axis of the pedestal the bracket 196 carries a downwardly extending lug 198, on which is pivoted a trip lever 199 by a rivet 201, the lever being preferably struck from sheet metal. The lever 199 includes a long arm 202 and a short arm 203, bent perpendicular to the surface of the long arm 202 and extending laterally across the axis of the pedestal 194. Additionally, the trip lever 199 is urged in clockwise direction by a coil spring 204, in tension between an ear 206, preferably struck downwardly from the bracket on one side of the axis of pedestal 194, and the long arm 202, on the opposite side of the pedestal axis. The pedestal is provided with a bore 207, in which is slidably mounted a shaft 208 which is in engagement with the arm 203. The lower portion of the pedestal is counterbored at 209 to accommodate a washer 211 on shaft 208 and nut 212, threaded on said shaft to limit the upward displacement of the rod while a button or head 213 upwardly of the shaft limits the downward displacement of the shaft. The function of the latter limiting factor is illustrated in Fig. 27 wherein the shaft is pressed downwardly, against the resistance of spring 204. In this operation the rocking motion of the lever 199 imparts rocking motion to the member 176 (Figs. 26 and 27) through the medium of some flexible member such as a cord or wire 214. An advantage of the member 214 is, of course, that it can be readily cut to conform to the particular position it is desired to install the trip mechanism in, the position being in accordance with the style or size of housing the trip mechanism is to be used on.

The control member 111, Fig. 14, is slidably coupled to the carriage 14. It is preferably struck from sheet metal and includes a section 215, generally rectangular in formation at the right thereof. The section 215 is of width substantially greater than the distance between the lugs 134 on either side of the sub-frame. That portion of the control member which extends to the left of section 215 is of width substantially less than the distance between the two lugs 134, thereby providing shoulders 216 adapted to abut the lugs 134, which abutment takes place as the pickup arm 4 reaches the run out groove on a record. Toward the left hand end the distance transversely of the control member is additionally reduced from one side at 217 and includes the abutment member 174, struck downwardly therefrom. Near the side 217 the member 111 includes an elongated slot 218, of length substantially equal to the length of a notch or recess 219 extending from one of the arms 148 along the edge of plate 141. Other details in the construction of the control member 111 will be referred to hereinafter and described.

Novel means are employed to associate the control member 111 with the carriage 14. That association of these parts may be more effective. I prefer to space them slightly from each other. Therefore, the section 215 is dented to provide feet 221 (Figs. 14 and 22), extending downwardly and spaced from each other. Besides the feet 221 the member 111 is provided with a longitudinally extending deformation 222 from the side of which extends an arm 223, of the deformation 222. The arm 223 is necessary as a spacing factor since there is a longitudinally extending deformation 224, below the deformation 222, in the plate 141 (Figs. 12 and 14). Other elongated deformations include one 226, parallel to the deformation 224, and a deformation 227 obliquely of the sides of the control member 111. Besides playing the role of spacing factors, the deformations increase the capacity of both the plate 141 and control member 111 to resist forces tending to bend them. Another desirable feature is the provision thus made for lubrication between the carriage and control member. Since the lubricant employed between these parts is in the form of a grease rather than a thin oil, and the grease is applied at the time the control member is initially associated in assembly with the carriage, the space between the parts retains the lubricant so that it does not need replenishing for long periods of time.

Included in the means to tie the control member 111 in slidable association with the carriage 14 is a spring 228, Figs. 15 and 28. It may be appropriately formed from resilient wire and has arms 229 and 231, extending from a central looped portion 232. The spring is disposed in substantially parallel relationship to the plate 141 and includes portions 233 and 234, bent abruptly downward in extension through slot 218 and notch 219, below the slot. The spring terminates in end portions 236 and 237, bent abruptly from the portions 233 and 234, and extending under the plate 141. As will be understood from Fig. 28, the arms 229 and 231, in cooperation with the portions 236 and 237 prevent vertical displacement of the control member from the plate 141. Also, the vertical portions 233 and 234, by virtue of their resistance to shear, prevent displacement of the control member 111 to the left of the plate.

Means to retain the control member against displacement to the right of plate 141 includes the automatic stop member 174 which abuts the right hand side of a slot 238, extending longitudinally of the plate 141 so that the member 174 may have freedom of motion as the control member slides over the carriage. The foregoing features provide retention of the left hand end of the control member 111 (Fig. 15) in engagement with the plate 141. The right hand end of member 111 is restrained from lateral displacement by a slot 239, extending longitudinally of the control member, the sides of the slot being in bearing relationship with the shaft 69 passing through said slot.

The shaft 69 receives axial motion from the carriage 14. More specifically, the motion is imparted to the shaft 69 by a cam 241, integral with the carriage 14 as said carriage is moved along the rods 133. In order that the carriage may have cam surfaces thereon, the plate 141 is deformed downwardly, as will be noted in Figures 9, 14 and 22. The deformation includes a portion 242 spaced from but parallel to the top surface of the plate 141. In addition, the cam includes regions 243 and 244 slanting upwardly from the portion 242. The shaft 69, on the other hand, carries a washer 245, Figs. 9 and 22, slidable axially thereof which is pressed against the cam 241 by a compression spring 246, coiled about the shaft 69 between the washer and a stop-cam 247, rigidly attached to the end of shaft 69. To prevent upward displacement of the washer 245 beyond a predetermined limit some suitable stop means must be employed on the shaft 69. A convenient one may take the form of an annular groove 248 into which a split ring 249 is adapted to normally press by virtue of its resiliency. In order to permit for longitudinal movement of the carriage relative to the shaft 69, said shaft extends through a slot 251 extending throughout the length of and slightly beyond the slanting regions 243 and 244 of cam 241. The width of the slot, although less than the diameter of the washer 245, is great enough to conveniently accommodate the diameter of the ring 249. When, therefore, the pickup arm 4 is in engagement with a record being played, the carriage 14 is in the position in which it is indicated in Figs. 8 and 15, and the washer 245 rests against the plate 141 to the right of the inclined surface 244. When a record is rejected, however, by either of the methods already described, the wheel 152 becomes drivingly associated with the driven pulley 167. Thereupon the eccentrically mounted wheel 152 slides the carriage 14 along the rails 133, toward the right and against the resistance of spring 151. During this travel of the carriage, the inclined surface 244 presses downwardly on washer 245 until the washer rides under the horizontal part of the cam 242, thereby moving the shaft 69 downwardly. But the spring 246 is stiffer, and its resistance to axial deflection is materially greater than the axial resistance to deflection offered by the spring 107 (Fig. 9). Therefore, the tilt arm 103 is pressed downwardly, in which operation the spring 107 is deflected, and the pickup arm is rocked about the studs 91 from the position of Fig. 8 to the position of Fig. 9. Uniform driving relationship being maintained between the wheel 152 and pulley 162, the carriage is moved back toward the Fig. 8 position by spring 151, until the wheel 152 is swung out of driving engagement with pulley 162 by the spring 168, and the latch 171 brings the wheel to a stop as it strikes the abutments 174 and 176. A rejection cycle is thus completed as the pickup arm is lowered into a position in which it is adapted to begin playing a record.

During the operation of playing a record, the control member 111 is held in place by the variable torque coupling 109. The position of member 111 is so maintained although the spring 228 tends to move it from its Fig. 15 to its Fig. 16 position. This is to retain the automatic abutment member 174 in the position in which it is indicated in Fig. 23, since the abutment member is an integral part of the control member 111. The holding operation of the variable torque coupling 109 is carried on by means including a pin or follower 252, extending downwardly from the end of arm 113, and a cam 253, with which the follower is adapted to cooperate. The cam 253 is at one side of an aperture 254 in the member 111. The surface of the cam substantially coincides with the arc that the follower 252 is adapted to pass through, so that there is no variation in the position of the abutment member 174 as the pickup arm is carried across the surface of a record, and the follower 252 is simultaneously carried across the surface of cam 253. Coincident with the pickup arm reaching the runout groove on a record the follower 252 reaches the end of cam 253, and by passing into an arm or notch 256 of the aperture 254 allows the force of spring 228 to move the control member 111 from the Fig. 15 position to the position in which the follower is indicated in Fig. 16.

But the position in which the follower is indicated in Fig. 16 is but an instantaneous position. This is because the abutment member 174 having been moved out of engagement with latch 171 the wheel 152 immediately starts rotating to thereby move the carriage and control member to the right again, accompanied by manipulation of the coupling 129.

In order that the follower 252 may be moved from the position in which it is indicated by Fig. 16 a finger 257, struck from the plate 141, is adapted to engage a curved cam surface 258 on the arm 114, which is adapted to be swung outwardly to the positions thereof indicated by Figs. 17 and 18. This is effected against the resistance of spring 119 while the arm 113 is retained in either of two positions, depending on the size of record being played, by means to be later described. In this connection it is noteworthy that the cam surface 258 curves from the free end of arm 114 a substantial distance from the opposite or straight side 259 of arm 114. This provides for a substantial increase in the angular velocity of the pickup arm between the point where the pickup arm is disengaged from a record to the point where the arm is brought to a standstill at its extreme outward position.

From its extreme outward position, the pickup arm is moved to a point just over the beginning of a 10-inch or a 12-inch record by the spring 119. To provide for the difference in size of the records on to which the pickup arm is lowered the aperture 254 is, in part, defined by two surfaces 261 and 262, extending longitudinally of the plate 141. The surface 261 is adapted to be engaged by the follower 252 when a 10-inch record is to be played while the follower 252 is adapted to engage the surface 262 when a 12-inch record is to be played. As a measure to increase the bearing area between the follower 252 and areas engaged thereby; also to be sure of confining the follower 252 by the walls defining the aperture 254 the edge of the plate 141 may be flared upwardly as will be noted from the surface 261 to the notch 256, the flared region being indicated by the character 263.

From the foregoing, it will be understood that means must be provided to make the follower 252 engage the surface 261 or 262, depending on the size of record it is desired to play. It will also be understood when the ejector head 11 is rotated about the axis of the adjustments shaft 69 through a half turn, from the position of Figs. 4 and 5 to the position of Fig. 6 that the shaft 69 is also turned through a half revolution. I, therefore, take advantage of this construction to rotatably support the stop 247 on the lower end of shaft 69, as will be noted in Figs. 8 and 21. The stop 247 is of elongated formation and has opposed ends 266 and 267 of identical radii. Preferably, the stop 247 may be struck from sheet metal so as to include a hub portion 268, to assist in its rigid mounting on the shaft 69. At one side thereof, the stop also includes an arm 269 having downwardly struck ears 271, laterally of the free end thereof. In the drawing (Fig. 21) the arm 269 is shown as it is after it has been turned, clockwise slightly, against the force of the spring 54 (Fig. 4) by pressure exerted on the arm by the lug 147 (Fig. 21). While this operation provides for dislodging a 10-inch record from the ejector head it is necessary for the stop plate 247 to be rotated through a half turn from the position in which it is indicated in Fig. 15 before a 12-inch record can be dislodged from the ejector head. The stop plate 247 is swung to the latter position by turning the rotatable part of the ejector head through a half turn. When in readiness for ejecting a 12-inch record the stop plate 247 with its arm 269 is rotated a half turn from the position shown in Fig. 21 where it is adapted to be engaged by the lug 146 by which the arm is swung to the broken line position as the push plate 13 ejects a record from the support of the ejector head. As a means to compensate for the difference in distance between the shaft 69 and the respective courses passed through by lugs 146 and 147 the lug 146 extends slightly farther to the right than does the lug 147. Regardless of which position the arm 269 is swung to, however, the stop 247 is adapted to arrest the movement of the control member 111 which it does by abutment with a stop pin 272, extending downwardly from the control member through the slot 251. It is also noteworthy that the pin 272 may not approach so closely to the shaft 69 when the record player is adjusted to play a 12-inch record as it may when the record changer is in readiness for playing a 10-inch record. This is because the stop 247 is supported eccentrically thereof on the shaft 69. The difference between the distance to which the pin 272 may approach shaft 69 when the record changer is in readiness for dispensing 10-inch records and 12-inch records, respectively, is substantially equal to the distance between the surfaces 261 and 262 on the plate 111. Therefore, it will be apparent how the follower 252 is adapted to be swung against the surface 261 (Fig. 17) when the carriage advances from left to right assuming the record changer is in a state of adjustment for playing 10-inch records. If the record player is on the other hand, in readiness for playing 12-inch records and the stop plate is consequently turned to the position in which it is indicated in Fig. 18, then the member 111 may move, with the carriage 14, only as far to the right as is indicated, in which position the follower 252 is adapted to strike the surface 262 as a 12-inch record is replaced by another record of similar size.

The surfaces 261 and 262 govern the points at which the pickup arm is rocked into initial engagement with records of either 10-inch or 12-inch size. After the notch 256 (Fig. 16) is carried substantially to the right of the follower 252 the finger 257 swings the follower against one of the surfaces 261 or 262, by engaging the cam arm 114. The cam arm is thus swung additionally counterclockwise, during which operation the pickup arm is carried to its extreme outward position, the lug 123 being carried away from stop 122 against the resistance of spring 119. After a record from the stock R is then dropped to the support of the turntable the carriage starts its movement to the left. As this takes place, the pickup arm is moved clockwise by the spring 119 in engagement with one of the surfaces 261 or 262, the arm 114 remaining in engagement with the finger 257. After the carriage has travelled leftward for some distance, the lug 123 is returned to a state of abutment with the stop 122 and thereupon the finger 257 is carried out of engagement with arm 114. In the meantime, since the follower is in engagement with one of the surfaces 261 or 262 the follower so remains, until the cam 241 traveling leftward with the carriage far enough allows spring 107 (Fig. 9) to move the shaft 69 upwardly, thereby providing for rocking of the pickup arm vertically into engagement with a record. Although the abutment surfaces 261 and 267 provide means to govern the position from which the pickup arm may be rocked downwardly to a record the adjustable feature of the stop 122 is provided in order that the pickup arm may be adjustably made to engage a record of either size at the beginning of the same.

Resilient means is employed to supplement the functions of the spring 228. It includes a spring 274 anchored to the control member 111. The spring 274 may take the form of a resilient wire, one end of which is curled about the pin 272, in close proximity to the lower side of plate 141, from which it extends upwardly through the slot 239, thence to the upwardly flared portion 263, with which it is intimately associated, for support, thence outwardly beyond the side of carriage 14 and terminates in a free end, adapted to be engaged by the finger 257. As previously indicated, the member 111 is coupled to the carriage 14 by means including a spring 228 which serves to yieldably communicate longitudinal motion to the control member from the carriage, as said carriage is moved to the right from the position of Fig. 16. The force of spring 228 also returns the control member to the Fig. 15 position, just before the pickup arm initially engages a record which is about to be played. But the force of spring 228 is comparatively weak and while it is of sufficient strength to return the control member to the position indicated, I have found that use of this spring alone is sometimes followed by the pickup arm either passing or falling short of the point from which it is adapted to be rocked downward into engagement with a record, as the arm 4 is returning from its extreme outward position. Accordingly, the spring 274 is employed. It is deflected as indicated in Figs. 17 and 18, and consequently, I gain the combined force of both spring 274 and spring 228 to return the pickup arm from its extreme outward position toward the position in which the arm is adapted to engage a record. As the pickup arm approaches, and is in comparatively close proximity to one of the points from which it is rocked downwardly into engagement with a record, however, the finger 257 is withdrawn from engagement with the spring 274, thus leaving the spring 228 to complete the angular movement of the pickup arm.

As previously indicated, safety features are incorporated in my improved record changer. They are principally for avoidance of breakage or other injury to mechanism adapted to manipulate the pickup arm particularly when it is disengaged from a record. For example, should some person grasp the pickup arm, when the machine is changing records, and forcibly swing said arm clockwise from the Fig. 18 position, even as far as the spindle 9, no harm would be sustained by the record changer, due to the yieldable torque coupling 109. While the pickup arm is in this arbitrary position, the members of the yieldable torque mechanism occupy positions indicated by Fig. 19. Therein, it will be noted that, since the support 112 is rotatably coupled to the pickup arm, it is rotated clockwise against the resistance of spring 128, the finger 257 remaining in engagement with cam surface 258. On the other hand, should the pickup arm be arbitrarily swung counterclockwise, even as far as the column 19 no harm will be sustained by the mechanism, due to the coupling 109. While the pickup arm is forcibly moved into this position the components of the yieldable torque mechanism occupy positions indicated by Fig. 20. Therein, as will be observed, the arm 114 remains in the same relation to the support 112 as it does in Figs. 17 and 18. Consequently the arm 114 is removed from engagement with the finger 257. The stop 122 is spaced from the lug 123, additionally, as the spring 119 is elongated, additionally. Since the support 112 is rotated counterclockwise slightly, follower 252 is displaced from the surface 262 and being pushed to the left exerts sufficient moment of force against an inclined surface 276 to move the control member 111 to the left, against the resistance of spring 228.

As an additional safety feature, the pickup arm may be arbitrarily forced downwardly from any point through which it is carried. This can be understood by referring to Fig. 8, wherein it will be noted that if the left hand end of arm 4 be depressed, said arm is rocked about the pivots 91, thereby lifting the tilt arm 103, since it rests on the stud 101. The collar 87 being rigidly supported by shaft 69, said shaft is lifted, against the resistance of the spring 246 (Fig. 9). This will be apparent from Fig. 22 wherein the raised positions of the stop plate 247 and the position into which the pickup arm is downwardly forced are indicated by broken line.

Precautions have been taken to so separate the support of the turntable from the support of the spindle that when this machine is running an imperfection or maladjustment of one of these members will not give rise to imperfections in operation of the other of the members. Figs. 12 and 13 indicate the means employed to obviate these difficulties. As will be noted, the turntable 3 has a tubular shaft 277, extending downwardly therefrom, which is rigidly mounted centrally of a hub 278 on the turntable. The turntable frame 132 includes the vertical side walls 279 and 281, in addition to the upward and outward extensions thereof 140 which provide arms, by which the frame 16 is, in part, bolted to the housing 2. The side walls 279 and 281 are joined to each other, at their bases, by a horizontal web 283, adjacent the junction of rods 113 with the frame 132. From the lower side of web 283, a boss 284 extends downwardly and has a bore 285, and a sleeve 286 therein, to provide a bearing for the tubular shaft 277, journaled in said sleeve. Opposite the boss 284 is an upwardly extending boss 287, on the base wall 282, which is counterbored at 288 to support therein a second sleeve 289, in which is journaled the shaft 277. The web 283 provides a seat for bearing means which includes a ball bearing 290 having races 291, one of which is spaced from the hub 278 by a washer 292, of suitable fibrous insulating material, while a second washer 293, similar to the washer 292, spaces the remaining race from the web 283. While the bearing means, just referred to, sustains the turntable against downward displacement, upward displacement of the turntable is adapted to be resisted by the pulley 167, adjustably mounted on the shaft 277. It will be noted that the pulley 167 is in spaced relationship to the sleeve 286 and that the lower extremity of shaft 277 is also in spaced relationship to the bottom of counterbore 288. Thus the turntable 3 is axially anchored to the web 283 and boss 284, from which it is insulated by the fibrous washers 292 and 293; that is, against the slight noise of rotation otherwise perceptible due to friction between adjacent parts when the turntable is rotating.

Although the spindle 9 is mounted within the tubular shaft 277 the spindle is in spaced relationship to the shaft. This is due, for one reason, to the fact that the internal diameter of shaft 277 is of substantially greater diameter than the diameter of the spindle. Additionally, it is due to the manner in which the spindle is supported, at one end thereof, from the base wall 282, centrally of the counterbore 288. To provide this support, the lower end of the spindle is of reduced diameter at 294 and threaded to receive a nut 296. Since a shoulder 297 is occasioned by the section 294, the nut 261 draws the shoulder 297 against the base wall 282 in which operation the nut is assisted by a washer 299 and a lock washer 300. For the purpose of holding the spindle 9 against forces tending to rotate it, and also as a convenience for assembling the spindle in effective relationship to the frame 132, the section 294 is provided with opposed flat surfaces 301 (Fig. 13) which are adapted to register with complementary flat surfaces 302 in the hole 298.

A summary of the operation of the apparatus is as follows:

It being assumed that the tone arm 4 is resting on the head 213 of the pedestal 194, where it has previously been manually placed, the yoke 63 is rotated out of the way, and a stack of records placed on the shoulder 12 of the center post with the edges of the lowermost record seated on the fingers 38 of the rotatable support plate 23. At this time, the lowermost record is opposite to the ejector plate 13 and ready to be engaged thereby. The yoke 63 is then rotated to the position shown in Fig. 1 wherein the end of the yoke is engaged with the topmost record. The motor 6 is then energized which causes the turntable to revolve.

Downward pressure on the tone arm forces the head 213 downward, rotating the lever 199 and pulling the connecting wire 214 which rotates the manual trip lever 176 about its pivot removing it from engagement with the latch 171. The wheel 152 is then rotated by the spring 168 about its eccentric pivot, into engagement with the friction pulley 167 on the turntable hub. The hub rotates the wheel, and the pivot of the eccentric wheel moves away from the hub because of the increasing radius, which movement is transmitted to the carriage 14 that slides on the rods 33 against the pressure of the spring 151, the carriage being moved from left to right as viewed in the figures.

The first movement of the carriage causes the tone arm to be lifted. This is effected by cam surfaces 241 and 242 which engage the collar or washer 245 on the rod 69 forcing the rod downward, the force being applied through the spring 246 to the cam plate 257. This pulls down the collar 87, forcing down with it the tilt arm lever 103. The arm of the tilt lever engages the pin 101 on the back of the tone arm and tilts the tone arm about the pivots 91. At this time, the spring 107 is compressed. See Fig. 9. Should the tone arm be held against upward movement or pushed downward after the upward movement, the shaft 69 may move upward through the sleeve compressing the spring 246 without damage to any of the mechanism.

As the carriage continues to the right in its travel, the finger 257 first engages with the spring 274 (which acts as a helper spring on the return movement) next the finger 257 engages with the cam surface 258 of the cam arm 114 swinging the cam arm and the follower arm 113, through the spring 119, together with the support plate and thence rotates the tubular shaft 79. The shaft 79 at this time swings the tone arm through the carrier 80, outward toward the periphery of the turntable. During the movement of the carriage, it carries with it the control member 111 which moves with the carriage until the stop pin 272 engages the surface 266 of the stop cam 247, at which time the control member stops. Further continued movement of the carriage and the cam causes the tone arm to swing out still farther, but the follower arm 113 is stopped because the follower pin 252 engages with side 261 of the opening in the control plate, which later determines the set down point for the tone arm. The tone arm continues to move outward well beyond the edge of the turntable, the spring 119 connecting the arms 113 and 114, stretching until it is well beyond the path of travel of a falling record whether it be a 10 or 12-inch record. At this time the lug 147 (Fig. 8), if the machine is set for playing 10-inch records, engages the arm 269 of the stop plate rotating the plate and thence the shaft 69.

The shaft 69 swings the ejector arm 71 which is in engagement with the pin 68 and moves the pin, and thence the ejector plate, to shove the bottom record from under the stack off of the center edge supports. The offset portion of the center post prevents the dislodging of more than one record at a time. The record falls onto the turntable, being guided in its fall by the spindle 9.

The wheel 152 and the carriage have now reached their maximum amount of travel (Fig. 9), and now start on their return which is effected by the spring 151.

On the return travel, the lug 147 moves away from the cam 114, but the cam is kept in contact therewith by the spring 119 until the stop 122 contacts the stop 123 on the plate 112 by which the arms 113 and 114 are pivotally carried.

The set down point of the follower arm, having been determined by the pin 252 in engagement with the control plate, inward movement of the pickup arm ceases.

Continued movement of the carriage causes the pickup arm to be lowered onto the record since the cam surfaces 242 slide out of engagement with the ring 245.

In its movement to the left, the carriage carries with it the control plate 111 which is eventually stopped by the engagement of the pin 252 with the curved surface 253. In this position, the lug 174 on the plates is disposed to cooperate with the abutment 176 to engage the latch 171 (Fig. 23) on the wheel 152 which holds the wheel out of engagement with the drive hub on the turntable.

This completes the cycle when the changer is manually tripped.

The record is now played, and as the tone arm follows the grooves, the follower arm 113 moves with it the follower pin 252 sliding across the curved surface 253 of the control member. The control member is being urged against the follower pin by the spring 228 and when the pin 252 finally arrives at the notch 256, the control member moves carrying with it the lug 174 which automatically releases the wheel 152 and the change cycle starts. The operation otherwise is the same as that previously described.

Two different conditions are present at the start of the change cycle. In the first described, the tone arm was disposed on the pedestal. At that time, the follower arm 113 had been moved with the tone arm until the pin 252 had engaged with surface 262 on the control member, stopping the follower arm, and the cam plate 114 had been moved away from the follower arm stretching the spring 119, which spring was under tension during the time the tone arm remained on the pedestal.

At this point it should be noted that the tone arm, because of the spring 119, is spring pressed inwardly toward the turntable but is prevented because of its engagement with the head 213 on the shaft 208 carried by the pedestal. In order to further hold the tone arm in this position, the tone arm, which has an inverted U-shaped cross section, is provided with an inwardly extending rib or ledge 310 which extends slightly under the head 213.

The tone arm is therefore disposed on the pedestal where it remains until such time as the cam 114, which had previously been moved outward, is engaged by the lug 147, moving it out still farther together with the tone arm, at which time the pressure of the tone arm (laterally) on the head 213 is relieved.

It should also be noted that prior to this time, the cam surfaces 242 had attempted to raise the tone arm but its engagement with the pedestal, which had manually raised the tone arm slightly, had prevented the tone arm from being raised, the collar 245 sliding downward against the pressure of the spring 246. The pressure on the tone arm being released, the spring 246 causes the tone arm to rise suddenly releasing the same from its engagement with the pedestal.

The other condition which exists at the start of the change cycle exists when the tone arm has followed the record grooves through to the end, at which time the follower arm and its pin 252 cause the release of the control member 111. At this time, the tone arm is at the limit of its movement toward the center of the record. The follower arm and the cam arm 113 and 114 are in the position shown in Fig. 16. The start of movement of the carriage causes the control member 111 to be moved so that the pin 252 moves out of the notch 256 (Fig. 19), after which the lug 257 (after the tone arm has been raised) engages the cam 114 and swings the tone arm outward. The remainder of the movement is as has been described.

Having thus described my invention in an embodiment thereof, I am aware that numerous and extensive departures may be made therefrom without departing from the spirit or scope of my invention.

I claim:

1. In an automatic record changer of the class described including a frame, a driven turntable supported by said frame, means adjacent said turntable for supporting and releasing records to said turntable, a pickup arm to engage records on said turntable, and means driven by said turntable to manipulate said pickup arm, a carriage in slidable association with said frame, driving means in association with said carriage and adapted to be driven by said turntable to thereby impart reciprocatory motion to said carriage, resilient means fixed between said driving means and said carriage to initiate driving relationship between said driving means and said turntable, means to obstruct initiation of said driving relationship while a record is being played, said obstructing means comprising a pivoted latch carried by said driving member, said latch being adapted to be carried through an operative orbit, movable abutment members adjacent said orbit which are adapted to be engaged by said latch and collectively obstruct rotation of said driving member, separate means for disengaging either of said abutment members to severally provide for release of said driving member and initiate driving relationship thereof with said turntable so that a record may be rejected by either release operation.

2. In an automatic record changer of the class described including a frame, a driven turntable supported by said frame, means adjacent said turntable for supporting and releasing records to said turntable, and a pickup arm to engage records on said turntable, means to operatively manipulate said pickup arm both vertically and laterally including a carriage in slidable association with said frame, driving means in association with said carriage and adapted to be driven by said turntable to impart reciprocatory motion to said carriage, a control member in slidable association with said carriage and adapted to occupy a stop position during playing of a record, spring means between said carriage and said control member to urge said control member into stop position, resilient means connected between said carriage and said driving means to initiate driving relationship between said driving means and said turntable, means to obstruct initiation of said driving relationship, said obstruction means comprising a latch pivoted on said driving member, said latch being adapted to be carried through an operative orbit, movable abutment members on either side of said orbit to engage said latch and thereby obstruct operation of said driving member when a record is being played, said abutment members being adapted to be separately moved from engagement with said latch to release the latch, one of said abutment members being carried by said control member to provide for automatic rejection of a record when said control member is moved away from stop position the other of said abutment members being carried by said frame, and lever means operatively connected to said last named abutment member to manually move it out of engagement with said latch to provide for manual rejection of a record.

3. In an automatic record changer of the class described including a frame supporting a driven turntable, record supporting and releasing means and a pickup arm in cooperative association with each other, a carriage in slidable association with said frame, driving means carried by said carriage and adapted to be driven by said turntable to thereby impart reciprocatory motion to said carriage, resilient means fixed between said driving means and said carriage to initiate driving relationship between said turntable and said driving means, means to obstruct said driving relationship to thereby obstruct rejection of a record comprising, a control member in slidable association with said carriage, a latch carried by said driving means, said latch being adapted to be carried through an operative orbit, movable abutment members normally engaging said latch on either side of said orbit and adapted to be severally disengaged from said latch to provide for release of said driving means, one of said abutment members being carried by said control member and therefore adapted to be automatically disengaged from said latch, resilient means to resist displacement of said control member relative to said carriage, a position cam on said control member, a pivoted follower arm to engage said cam and thereby restrain said abutment member carried by said control member from disengagement from said latch upon reciprocation of said carriage, and means to rotatably couple said follower arm to said pickup arm so that said follower arm may be disengaged from said position cam at the end of a record to thereby provide for disengagemen of said abutment member from said latch and consequent rejection of a record.

4. In an automatic record changer of the class described including a frame, a driven turntable, record supporting and releasing means and pickup arm in cooperative association with each other; means to manipulate said pickup arm both vertically and laterally including a carriage in slidable association with said frame, an eccentrically mounted wheel carried by said carriage and adapted to be driven by said turntable, spring means to urge said carriage toward said turntable, second spring means connected between said wheel and said carriage to initiate driving relationship between said wheel and said turntable to provide reciprocatory relationship between said carriage and said turntable when a record has been played, a control member in slidable association with said carriage, third spring means engaging said control member and said carriage to resist displacement of said control member relative to said carriage, an adjustment shaft adapted to be manually turned to a plurality of predetermined positions by said record supporting and releasing means, means on said shaft and engaging said control member adapted to stop said control member in a corresponding plurality of positions as said control member is carried away from said turntable, a corresponding plurality of limit surfaces on said control member and means on said pickup arm to engage said surfaces upon the lateral movement of said pickup arm when changing records to provide for effective initial engagement of said arm with a replacement record.

5. In an automatic record changer of the class described including a frame, a driven turntable, record supporting and releasing means and pickup arm in cooperative association with each other; means to manipulate said pickup arm laterally including a carriage in slidable association with said frame, an eccentrically mounted wheel carried by said carriage and adapted to be driven by said turntable, spring means engaging said carriage to urge said carriage toward said turntable, second spring means fixed between said wheel and said carriage to initiate driving relationship between said wheel and said turntable to impart reciprocatory motion to said carriage when a record has been played, a control member in slidable association with said carriage, third spring means engaging said control member and said carriage to resist displacement of said control member relative to said carriage, an adjustment shaft adapted to be manually turned to a plurality of predetermined positions by said record supporting and releasing means, means on said shaft and engaging said control member adapted to stop said control member in a corresponding plurality of positions as said control member is carried away from said turntable, a corresponding plurality of angularly-spaced limit surfaces on said control member and means on said pickup arm to engage said surfaces upon the lateral movement of said pickup arm which includes a yieldable torque coupling connecting said pickup arm to said carriage, said coupling allowing for forcible angular displacement of said pickup arm relative to said limit surfaces on said control member.

6. In an automatic record changer of the class described including a frame, a driven turntable, record supporting and releasing means and pickup arm in cooperative association with each other; means to manipulate said pickup arm both vertically and laterally including a carriage in slidable association with said frame, an eccentrically mounted wheel carried by said carriage and adapted to be driven by said turntable, spring means engaging said carriage to urge said carriage toward said turntable, second spring means fixed between said wheel and said carriage to initiate driving relationship between said wheel and said turntable to impart reciprocatory motion to said carriage when a record has been played, a control member in slidable association with said carriage, third spring means engaging said control member and said carriage to resist displacement of said control member relative to said carriage, an adjustment shaft adapted to be turned to a plurality of predetermined positions by said record supporting and releasing means, said shaft also being adaptable of axial movement, cam means on said carriage to slide said shaft axially to thereby sustain said pickup arm during changing of a record, an eccentrically mounted stop member on said shaft adapted to be swung to a plurality of predetermined positions as said record releasing means is regulated to accommodate records of a plurality of sizes, said stop member being adapted to interrupt movement of said control member from said turntable thereby providing a plurality of predetermined stations for said control member, a corresponding plurality of angularly spaced limit surfaces on said control member, a yieldable torque coupling in association with said carriage and said control member, said coupling comprising a support member, means to couple said support member rotatably to said pickup arm, a cam arm pivoted to said support member, a follower arm also pivoted to said support member, spring means to urge said arms toward each other, stop means on said follower arm to limit the effect of said last named spring, and spring means to tie said cam arm yieldably to said support thereby yieldably tieing said cam arm to said pickup arm, said cam arm being adapted to be swung away from said follower arm by said carriage as said carriage is moved away from said turntable, said follower arm being anchored against displacement thereof by engagement with one of said limit surfaces as said pickup arm is swung in one direction, said pickup arm being adapted to be lowered to effective initial engagement with a record as said cam means is carried from sustaining position when said carriage is returned toward said turntable.

7. In an automatic record changer of the class described including a frame, a driven turntable, record supporting and releasing means and pickup arm in cooperative association with each other; means to manipulate said pickup arm both vertically and laterally including a carriage in slidable association with said frame, means to provide for reciprocatory motions of said carriage when a record has been played, a control member in slidable association with said carriage, resilient means engaging said control member and said carriage to resist displacement of said control member relative to said carriage, means to automatically limit the stroke of said control member according to the size of records played, a plurality of angularly-spaced limit surfaces on said control member, a yieldable torque coupling in association with said carriage and said control member, said coupling comprising a support member, means to couple said support member rotatably to said pickup arm, a cam arm pivoted to said support member, a follower arm also pivoted to said support member, spring means between said arms to urge said arms toward each other, stop means on said follower arm to limit the effect of said spring, spring means to tie said cam arm yieldably to said support thereby yieldably tieing said cam arm to said pickup arm, said cam arm being adapted to be swung away from said follower arm by said carriage as said carriage is moved away from said turntable, said follower arm being anchored against displacement thereof by engagement with one of said limit surfaces as said pickup arm is swung in one direction, said second named spring means providing for a gradual decrease in the effect of said first spring to carry said pickup arm toward a point of initial engagement with a record as said carriage is returned toward said turnable.

8. In an automatic record changer of the class described including a frame, a driven turntable, record supporting and releasing means and pickup arm in cooperative association with each other, operating means for said pickup arm and said record supporting and releasing means comprising a single shaft engaging said pickup arm and said releasing means to rotate said shaft reciprocably, comprising a carriage in slidable association with said frame, an eccentrically mounted wheel carried by said carriage and adapted to be driven by said turntable, a spring means engaging said carriage to urge said carriage toward said turntable, second spring means fixed between said wheel and carriage to initiate driving relationship between said wheel and said turntable to provide reciprocatory relationship between said carriage and said frame when a record has been played, a control member in slidable association with said carriage, third spring means engaged between said control member and said carriage to resist displacement of said control member relative to said carriage, an eccentrically mounted stop member on said adjustment shaft adapted to arrest the movement of said control member in a plurality of predetermined positions as said control member is carried away from said turntable, a plurality of limit surfaces on said control member and means on said pickup arm to engage said surfaces upon the lateral movement of said pickup arm when changing records to provide for effective initial engagement of said arm with a replacement record, an arm on said stop member, and a plurality of lugs on said carriage adapted to severally engage said arm and rotate said shaft as said carriage is reciprocated thereby ejecting a record from said supporting and releasing means.

9. In an automatic record changer including a frame, a driven turntable supported by said frame, supporting means on said frame for supporting a stack of records above said turntable and releasing them singly onto said turntable, a pickup arm carrying a pickup to engage said records, means cooperating with said turntable to manipulate said arm comprising a carriage slidably disposed on said frame, driving means on said carriage adapted to be driven by said turntable to reciprocate said carriage, a control member slidably disposed on said carriage occupying a position for holding said driving means from driving engagement with the turntable, a vertical motion cam on said carriage, a sleeve rotatably journalled in said frame and carrying said pickup arm, a shaft slidably and rotatably journalled in said sleeve, a follower member slidably journalled on said shaft and engaging said vertical motion cam, an abutment member fixed on said shaft, spring means between said abutment member and said follower resiliently urging said shaft to act in unison with said follower, an arm rotatably journalled but axially fixed on said shaft engaging said pickup arm to move said pickup arm vertically in unison with said shaft.

10. In an automatic record changer including in combination a frame, a driven turntable supported by said frame, supporting means on said frame for supporting a stack of records above said turntable and releasing them singly onto said turntable, and a pickup arm carried on said frame, means cooperating with said turntable means to manipulate said arm comprising a carriage slidably disposed on said frame, driver means on said carriage driven by said turntable, adapted to reciprocate said carriage, a control member slidably disposed on said carriage and normally occupying a position for holding said driver means out of engagement with the turntable, pickup arm positioning cam members on said control member, spring means engaging said control member urging it into said holding position, a sleeve rotatably journalled in said frame carrying said pickup arm, yieldable torque means fixed to said sleeve for moving said pickup arm comprising a disk fixed to said sleeve, a positioning arm pivoted to said disk and engaging said cam members to position said pickup arm, adjustable means engaging said arm and said disk to hold said arm from pivoting beyond a certain point relative to said disk, a cam arm pivoted to said disk adapted to be engaged by said carriage upon reciprocation of said carriage, firm spring means between said cam arm and said disk to yieldably urge said disk and sleeve to operate in unison with said cam arm, less firm spring means between said positioning arm and said cam arm urging said cam arm to return to position set by engagement of said positioning arm in engagement with said stop cam members upon release of said cam arm from engagement with said carriage.

11. In an automatic record changer comprising in combination a frame, a driven turntable mounted on said frame, a pickup arm disposed on said frame adjacent said turntable and a record supporting and ejector means including a slidable member for dislodging a record from the support, operating means for said pickup arm and said ejector means comprising a carriage slidably disposed on said frame, driving means on said carriage driven by said turntable to cause reciprocatory motion of the carriage, a control member slidably disposed on said carriage and latch means on said driving means engaged by said control member to keep said driving means from operation and adapted to be released by movement of said control member, a sleeve rotatably journalled in said frame carrying said pickup arm at its upper end, said arm being pivotally journalled on said sleeve, yieldable torque means fixed on said sleeve engaging said carriage adapted to move said pickup arm laterally and position said arm for proper engagement with the records upon reciprocation of said carriage, a shaft slidably and pivotally journalled in said sleeve, follower means on said shaft, cam means on said carriage engaging said follower means to slide said shaft vertically, arm means on said shaft engaging said pickup arm to rock said pickup arm vertically upon vertical motion of said shaft, arm means fixed near the end of said shaft engaging said carriage to turn said shaft upon reciprocation of said carriage, lever means connected near the other end of said shaft connected to said ejector slidable means to operate the same in unison with the pickup arm upon turning of the shaft.

12. In an automatic record changer for playing different sized records including in combination a frame, a driven turntable mounted on said frame, a pickup arm disposed on said frame adjacent said turntable and record supporting and ejector means; operating means for said pickup arm and said ejector means comprising a carriage slidably disposed on said frame, driving means on said carriage driven by said turntable to cause reciprocatory motion of the carriage, a control member slidably disposed on said carriage, a plurality of positioning surfaces on said control member, latch means on said driving means engaged by said control member to keep said driving means from operation and adapted to be released by movement of said control member, a sleeve rotatably journalled in said frame carrying said pickup arm at its upper end, said arm being rockingly journalled on said sleeve, torque transmitting means fixed on said sleeve having a movement arm engaging said carriage to move said pickup arm laterally upon reciprocation of said carriage and a positioning arm engaging one or another of said positioning surfaces for positioning said pickup arm to engage the first groove of said records, a shaft slidably and pivotally journalled in said sleeve, follower means on said shaft, cam means on said carriage engaging said follower means to slide said shaft vertically, arm means on said shaft engaging said pickup arm to rock said pickup arm vertically upon vertical motion of said shaft, arm means fixed near the lower end of said shaft engaging said carriage to turn said shaft upon reciprocation of said carriage, and lever means fixed near the upper end of said shaft disposed in engagement with said ejector means to operate said ejector means in unison with said pickup arm.

13. In an automatic record changer including in combination a frame, a driven turntable mounted on said frame, a pickup arm disposed on said frame adjacent said turntable, and record support and ejector means above said pickup arm, operating means for said arm and said ejector comprising a carriage slidably disposed on said frame, an eccentrically mounted wheel carried by said carriage adapted to be driven by said turntable to reciprocate said carriage, first spring means on said frame engaging said carriage to urge it toward said turntable, second spring means engaging said carriage and said wheel adapted to initiate turning of said wheel to bring it into driven relationship with said turntable, a control member slidably disposed on said carriage, resilient means engaging said control member and said carriage yieldably holding said control member in position on said carriage and firmly holding the control member in close sliding relationship with said carriage, positioning surfaces on said control member, latch means pivoted on said wheel, a pair of abutment members normally engaging said latch to prevent rotation of said wheel and disposed on opposite sides of said latch, the first of said pair of abutment members being a part of said control member and adapted to be moved thereby, the second of said pair of abutment members being fixed on said frame to be moved by an external means, said latch adapted to be released by movement of either abutment member from its normal position, cam means on said control member formed to allow motion of said control member when said pickup arm reaches the "run-off" groove of a record to release said latch, a sleeve rotatably journalled on said frame carrying trunnion means on its upper end, yoke means on said pickup arm engaging said trunnion means to provide for vertical rocking of said pickup arm, yieldable torque transmitting means fixed on the lower end of said sleeve having a movement arm engaging said carriage to move said pickup arm laterally upon reciprocation of said carriage and a positioning arm engaging said positioning surface for positioning the pickup to engage the starting groove of a record, a shaft slidably and pivotally journalled in said sleeve, follower means on said shaft, cam means on said carriage engaging said follower means to slide said shaft vertically, arm means rotatably journalled and restricted slidably on said shaft engaging said pickup arm to rock said arm vertically upon vertical movement of said shaft, an arm on the lower end of said shaft adapted to engage said carriage to turn said shaft upon reciprocation of said carriage, and lever means fixed near the upper end of said shaft disposed in engagement with said ejector means to operate said ejector means in unison with said pickup arm.

14. In an automatic record changer for a plurality of sizes of records including a frame, a driven turntable on said frame, a pickup arm disposed on said frame adjacent said turntable, and record support and ejector means mounted on said frame above said pickup arm, operating means for said arm and said ejector comprising a carriage slidably disposed on said frame, an eccentrically mounted wheel carried by said carriage adapted to be driven by said turntable to reciprocate said carriage, first spring means on said frame engaging said carriage to urge it toward said turntable, second spring means engaging said carriage and said wheel adapted to initiate turning of said wheel to bring it into driven engagement with said turntable, a control member slidably disposed on said carriage, resilient means engaging said control member and said carriage yieldingly holding said control member in position on said carriage and firmly holding the control member in close sliding relationship with said carriage, cam means on said control member having a release portion and a plurality of positioning portions corresponding to the plurality of sizes of records to be played, latch means carried by said wheel, a pair of abutment members normally engaging said latch to prevent rotation of said wheel disposed on opposite sides of said latch, the first of said pair of abutment members being a part of said control member and adapted to be moved thereby, the second of said pair of abutment members being fixed on said frame adapted to be moved by an external means, said latch adapted to be released by movement of either abutment member from its normal position, a sleeve rotatably journalled on said frame carrying trunnion means on its upper end, yoke means on said pickup arm engaging said trunnion means to allow vertical rocking of said arm, yieldable torque means fixed on the lower end of said sleeve having a movement arm engaging said carriage to move said pickup arm laterally upon reciprocation of said carriage and a follower arm engaging said cam means on said control member said follower arm being adapted to release said control member upon reaching said release portion on said cam means when the pickup arm reaches a position corresponding to the location of the run-out groove of a record, said control member thereupon moving to release said latch, and said follower arm also adapted to engage one of the said positioning portions of said cam corresponding to the size of record being played to position the pickup to engage the starting groove of said record, a shaft slidably and pivotally journalled in said sleeve, follower means on said shaft, cam means on said carriage engaging said follower means to slide said shaft vertically, arm means rotatably journalled but restricted slidably on said shaft engaging said pickup arm to rock said arm vertically upon vertical movement of said shaft, a stop cam fixed on the lower end of said shaft having a plurality of stop surfaces corresponding to the plurality of positioning portions on said cam on said control member, said stop surfaces arranged to engage said control member to interrupt the motion of said control member and thereby position said positioning portion so that said follower arm will engage the positioning portion corresponding to the size record being played, arm means carried by said stop cam adapted to engage said carriage to rotate said shaft upon reciprocation of said carriage, and lever means fixed near the upper end of said shaft disposed in engagement with said ejector means to operate said ejector means in unison with said pickup arm.

GEORGE E. REDFIELD.

REFERENCES CITED

The following references are of record in the file of this patent:

UNITED STATES PATENTS

| Number | Name | Date |
|---|---|---|
| 2,328,641 | Glaser | Sept. 7, 1943 |
| 2,331,383 | Faulkner | Oct. 12, 1943 |
| 2,352,331 | Leline | June 27, 1944 |
| 2,357,520 | Kahl | Sept. 5, 1944 |
| 2,370,875 | Pressley | Mar. 6, 1945 |
| 2,387,916 | Knox et al. | Oct. 30, 1945 |
| 2,536,432 | Faulkner | Jan. 2, 1951 |